US012664207B2

(12) United States Patent
Miller

(10) Patent No.: US 12,664,207 B2
(45) Date of Patent: *Jun. 23, 2026

(54) CONTEXT-BASED DICTIONARIES FOR MULTIMEDIA AUDIOBOOK SYSTEMS INCLUDING LINGUISTIC DICTIONARY ENTRIES

(71) Applicant: Irving Wickliffe Miller, Reno, NV (US)

(72) Inventor: Irving Wickliffe Miller, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,672

(22) Filed: Oct. 7, 2024

(65) Prior Publication Data

US 2025/0077567 A1     Mar. 6, 2025

Related U.S. Application Data

(63) Continuation of application No. 18/458,859, filed on Aug. 30, 2023, now Pat. No. 12,141,188.

(51) Int. Cl.
G06F 16/432        (2019.01)
G06F 16/483        (2019.01)
(Continued)

(52) U.S. Cl.
CPC .......... G06F 16/433 (2019.01); G06F 16/483 (2019.01); G06F 40/242 (2020.01); G06F 40/30 (2020.01)

(58) Field of Classification Search
CPC .... G06F 16/433; G06F 16/483; G06F 40/242; G06F 40/30
See application file for complete search history.

(56) References Cited

U.S. PATENT DOCUMENTS 7,539,619 B1      5/2009 Seligman
8,731,905 B1      5/2014 Tsang
(Continued)

OTHER PUBLICATIONS

Maybury et al (Automatic Detection, Indexing, and Retrieval of Multiple Attributes From Cross-Lingual Multimedia Data) 2012.*

(Continued)

*Primary Examiner* — Aleksandr Kerzhner
*Assistant Examiner* — Samuel C Sharpless, III
(74) *Attorney, Agent, or Firm* — Amsel IP Law PLLC; Jason Amsel

(57)        ABSTRACT

A method, non-transitory computer-readable storage medium and system is disclosed for using context-based dictionaries to search through multimedia data using input that specifies tags, words, phrases, descriptions, environments, emotions, sentiments, multimedia objects or content, or other relevant attributes. The system retrieves original content, analyzes and processes it, and presents to the user synchronized multimedia content and text content that is automatically tagged for searching. The system creates dictionaries containing word definitions and information that have been customized according to context; in addition, the system creates textual and non-linguistic attributes that enable and enhance searching functions; moreover, it enables modification of the dictionary entries as well as its searching functions through a feedback loop that may include input from human users and artificial intelligence programs; furthermore, the system may be used to create or modify a linguistic or a multimedia instantiation of a story.

20 Claims, 21 Drawing Sheets

Example Linguistic Context Dictionary Entries

Story-X Text 102

Record the new world record in the record books!

Dictionary Entry 104
record
String: "record"
Part of Speech: Verb
Pronunciation: /rɪˈkɔːrd/
Definition: To officially document or make an entry of information.
Language Y Gloss: "yyyy"
Position: chars 0 - 5 in Story-X Dictionary Entry 006
record
String: "record"
Part of Speech: Noun
Pronunciation: /ˈrɛkɔːrd/
Definition: The highest achievement in a field or category.
Language Y Gloss: "yyyy"
Position: chars 21-27 in Story-X Dictionary Entry 108
record
String: "record"
Part of Speech: Attributive Noun
Pronunciation: /ˈrɛkɔːrd/
Definition: Of the highest achievement in a field or category.
(eg, record book)
Language Y Gloss: "yyyy"
Position: chars 35-41 in Story-X

(51) Int. Cl.
    *G06F 40/242*     (2020.01)
    *G06F 40/30*      (2020.01)

(56)                References Cited

U.S. PATENT DOCUMENTS

|               |          |                  |              |
| ------------- | -------- | ---------------- | ------------ |
| 8,893,030 B1  | 11/2014  | Anderson         |              |
| 9,927,957 B1  | 3/2018   | Sagar            |              |
| 10,140,310 B1 | 11/2018  | Kendall          |              |
| 10,146,789 B1 | 12/2018  | Lakshmanan       |              |
| 11,003,839 B1 | 5/2021   | Hatch            |              |
| 11,024,199 B1 | 6/2021   | Treves           |              |
| 11,545,134 B1 | 1/2023   | Federico         |              |
| 11,856,315 B2 | 12/2023  | Angquist         |              |
| 2008/0154577 A1 | 6/2008 | Kim              |              |
| 2011/0019020 A1 | 1/2011 | King             |              |
| 2012/0166180 A1 | 6/2012 | Au               |              |
| 2012/0310642 A1 | 12/2012| Cao              |              |
| 2014/0040713 A1 | 2/2014 | Dzik             |              |
| 2014/0208230 A1 | 7/2014 | Stanley          |              |
| 2014/0250355 A1 | 9/2014 | Jimison          |              |
| 2015/0042662 A1 | 2/2015 | Latorre-Martinez |              |
| 2015/0170648 A1 | 6/2015 | King             |              |
| 2018/0032610 A1 | 2/2018 | Cameron          |              |
| 2018/0046331 A1 | 2/2018 | Monson           |              |
| 2018/0211552 A1 | 7/2018 | Samuelson        |              |
| 2019/0005959 A1 | 1/2019 | Cameron          |              |
| 2019/0196675 A1 | 6/2019 | German           |              |
| 2020/0126559 A1* | 4/2020 | Ochshorn        | G11B 27/031  |
| 2020/0126584 A1 | 4/2020 | Huang            |              |
| 2020/0250216 A1 | 8/2020 | Mansjur          |              |
| 2020/0293266 A1 | 9/2020 | German           |              |
| 2021/0090592 A1 | 3/2021 | Lee              |              |
| 2021/0160583 A1 | 5/2021 | Hirtzel          |              |
| 2021/0165973 A1 | 6/2021 | Kofman           |              |
| 2021/0183260 A1 | 6/2021 | Raynaud          |              |
| 2021/0193109 A1 | 6/2021 | Verma            |              |
| 2022/0043987 A1 | 2/2022 | Wang             |              |
| 2022/0115020 A1 | 4/2022 | Bradley          |              |
| 2022/0358905 A1 | 11/2022| Gupta            |              |
| 2022/0366881 A1 | 11/2022| Williams         |              |
| 2023/0031056 A1 | 2/2023 | Chinta           |              |
| 2023/0252224 A1 | 8/2023 | Tran             |              |
| 2023/0276108 A1 | 8/2023 | Samuelson        |              |
| 2024/0265604 A1 | 8/2024 | Wang             |              |

OTHER PUBLICATIONS

Hu, "Automatic Detection, Indexing, and Retrieval of Multiple Attributes from Cross-Lingual Multimedia Data," in Multimedia Information Extraction: Advances in Video, Audio, and Imagery Analysis for Search, Data Mining, Surveillance and Authoring , IEEE 2011, pp. 221-233, doi: 10.1002/97811 (Year: 2011).

Notice of Allowance dated Jul. 15, 2024 for U.S. Appl. No. 18/458,859 (pp. 1-8).

Notice of Allowance dated Jul. 31, 2024 for U.S. Appl. No. 18/458,861 (pp. 1-9).

Notice of Allowance dated Aug. 12, 2024 for U.S. Appl. No. 18/458,859 (pp. 1-3).

Notice of Allowance dated Sep. 16, 2024 for U.S. Appl. No. 18/458,859 (pp. 1-3).

Office Action dated Jan. 3, 2024 for U.S. Appl. No. 18/324,649 (pp. 1-22).

Office Action dated Mar. 6, 2024 for U.S. Appl. No. 18/458,859 (pp. 1-20).

Office Action dated Apr. 8, 2024 for U.S. Appl. No. 18/458,861 (pp. 1-23).

Office Action dated Aug. 1, 2023 for U.S. Appl. No. 18/324,649 (pp. 1-12).

Office Action dated Oct. 26, 2023 for U.S. Appl. No. 18/458,859 (pp. 1-18).

Office Action dated Nov. 16, 2023 for U.S. Appl. No. 18/337,250 (pp. 1-6).

Office Action dated Nov. 22, 2023 for U.S. Appl. No. 18/458,861 (pp. 1-20).

Office Action dated Dec. 12, 2023 for U.S. Appl. No. 18/337,296 (pp. 1-11).

Piits, Liisi, Hille Pajupuu, Heete Sahkai, Rene Altrov, Liis Ermus, Kairi Tamuri, Indrek Hein et al. "Audiobook Dialogues as training data for conversational style synthetic voices." In Proceedings of the Thirteenth Language Resources and Evaluation Conference, pp. 1047-1053. 2022. (Year: 2022).

Office Action dated Apr. 17, 2026 for U.S. Appl. No. 19/460,859 (pp. 1-12).

* cited by examiner

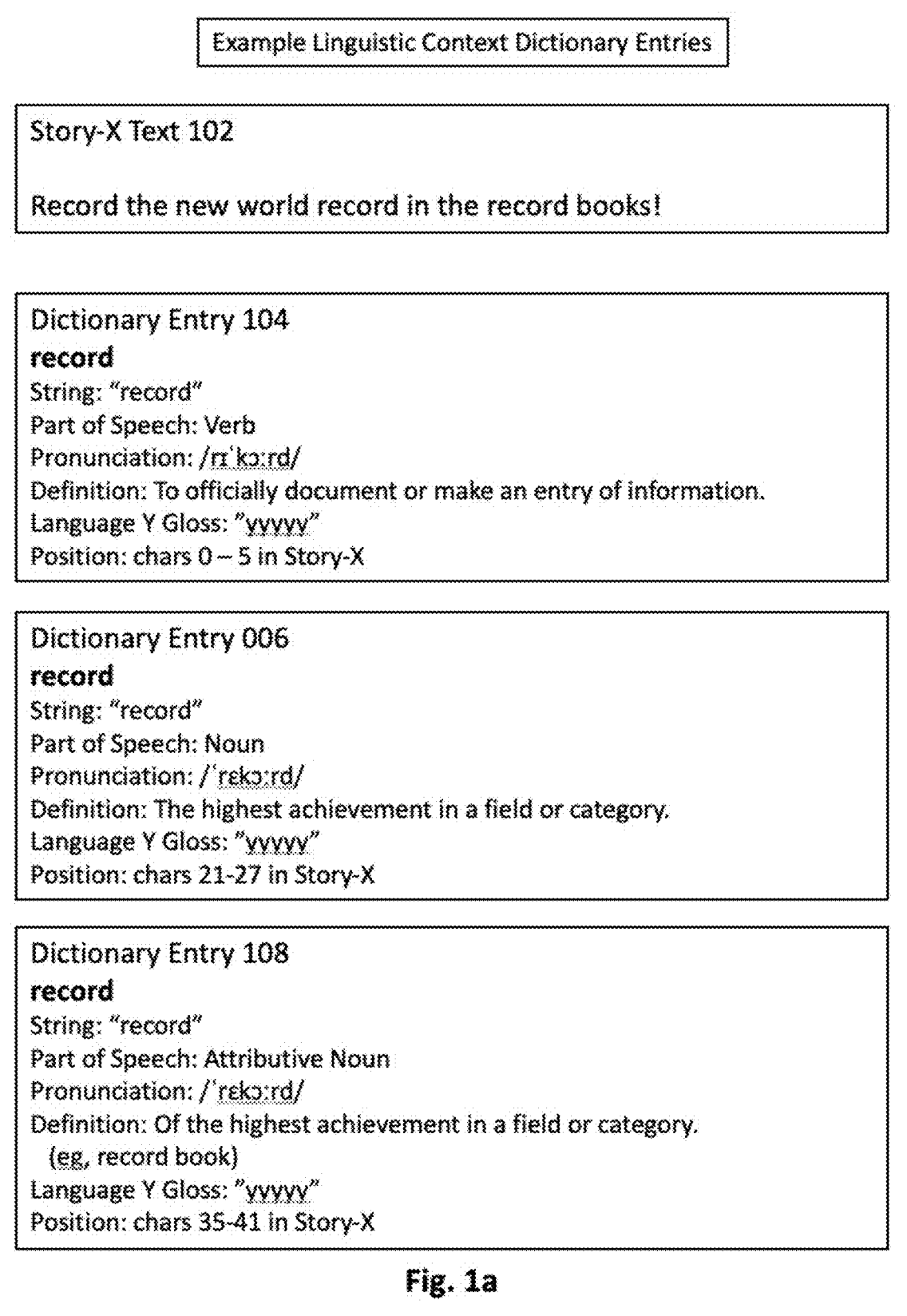

Example Linguistic Context Dictionary Entries

Story-X Text 102

Record the new world record in the record books!

Dictionary Entry 104
record
String: "record"
Part of Speech: Verb
Pronunciation: /rɪˈkɔːrd/
Definition: To officially document or make an entry of information.
Language Y Gloss: "yyyyy"
Position: chars 0 ~ 5 in Story-X Dictionary Entry 006
record
String: "record"
Part of Speech: Noun
Pronunciation: /ˈrekɔːrd/
Definition: The highest achievement in a field or category.
Language Y Gloss: "yyyyy"
Position: chars 21-27 in Story-X Dictionary Entry 108
record
String: "record"
Part of Speech: Attributive Noun
Pronunciation: /ˈrekɔːrd/
Definition: Of the highest achievement in a field or category.
  (eg, record book)
Language Y Gloss: "yyyyy"
Position: chars 35-41 in Story-X

Fig. 1a

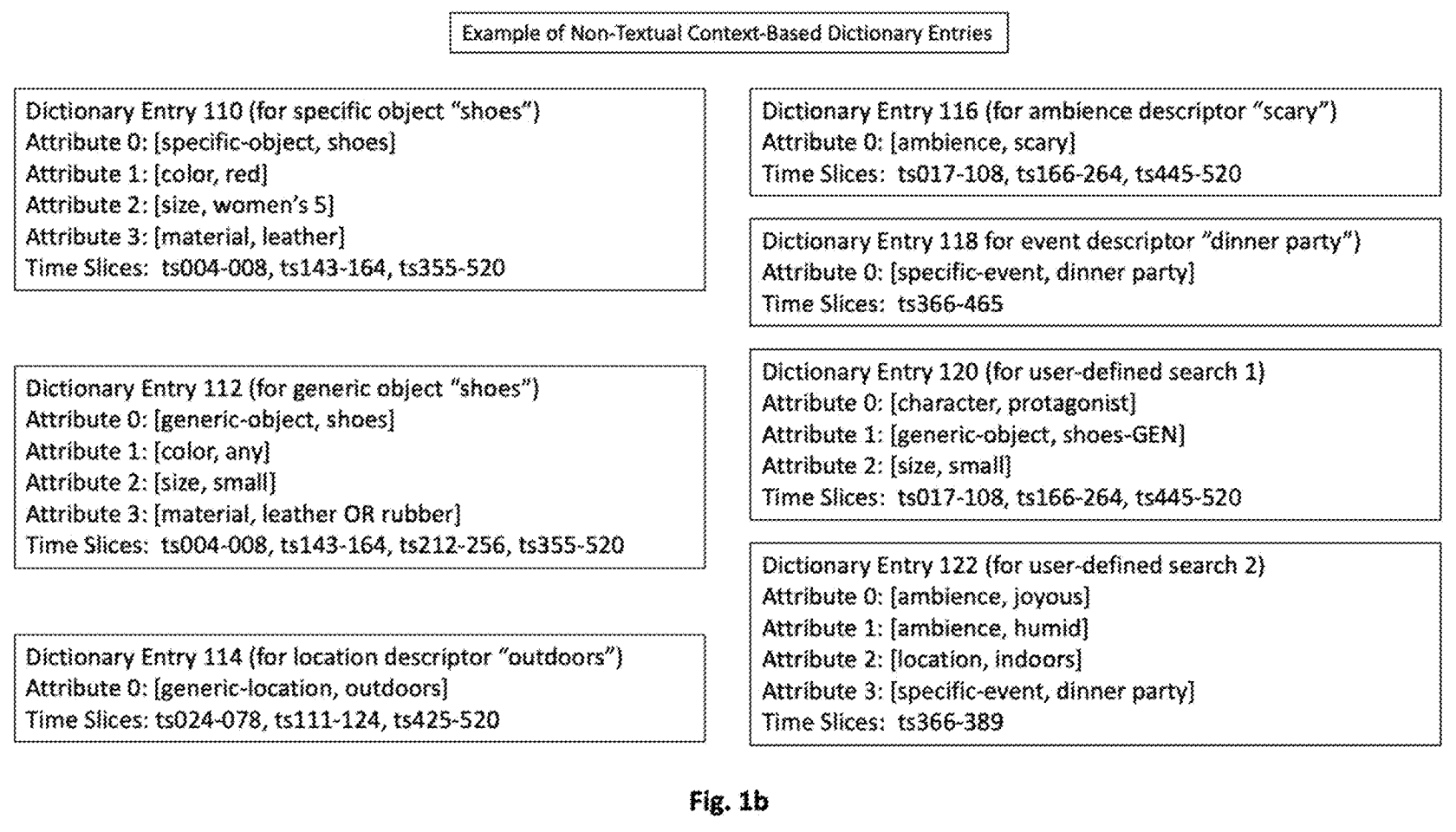

Example of Non-Textual Context-Based Dictionary Entries

Dictionary Entry 110 (for specific object "shoes")
Attribute 0: [specific-object, shoes]
Attribute 1: [color, red]
Attribute 2: [size, women's 5]
Attribute 3: [material, leather]
Time Slices: ts004-008, ts143-164, ts355-520

Dictionary Entry 112 (for generic object "shoes")
Attribute 0: [generic-object, shoes]
Attribute 1: [color, any]
Attribute 2: [size, small]
Attribute 3: [material, leather OR rubber]
Time Slices: ts004-008, ts143-164, ts212-256, ts355-520

Dictionary Entry 114 (for location descriptor "outdoors")
Attribute 0: [generic-location, outdoors]
Time Slices: ts024-078, ts111-124, ts425-520

Dictionary Entry 116 (for ambience descriptor "scary")
Attribute 0: [ambience, scary]
Time Slices: ts017-108, ts166-264, ts445-520

Dictionary Entry 118 for event descriptor "dinner party")
Attribute 0: [specific-event, dinner party]
Time Slices: ts366-465

Dictionary Entry 120 (for user-defined search 1)
Attribute 0: [character, protagonist]
Attribute 1: [generic-object, shoes-GEN]
Attribute 2: [size, small]
Time Slices: ts017-108, ts166-264, ts445-520

Dictionary Entry 122 (for user-defined search 2)
Attribute 0: [ambience, joyous]
Attribute 1: [ambience, humid]
Attribute 2: [location, indoors]
Attribute 3: [specific-event, dinner party]
Time Slices: ts366-389

Fig. 1b

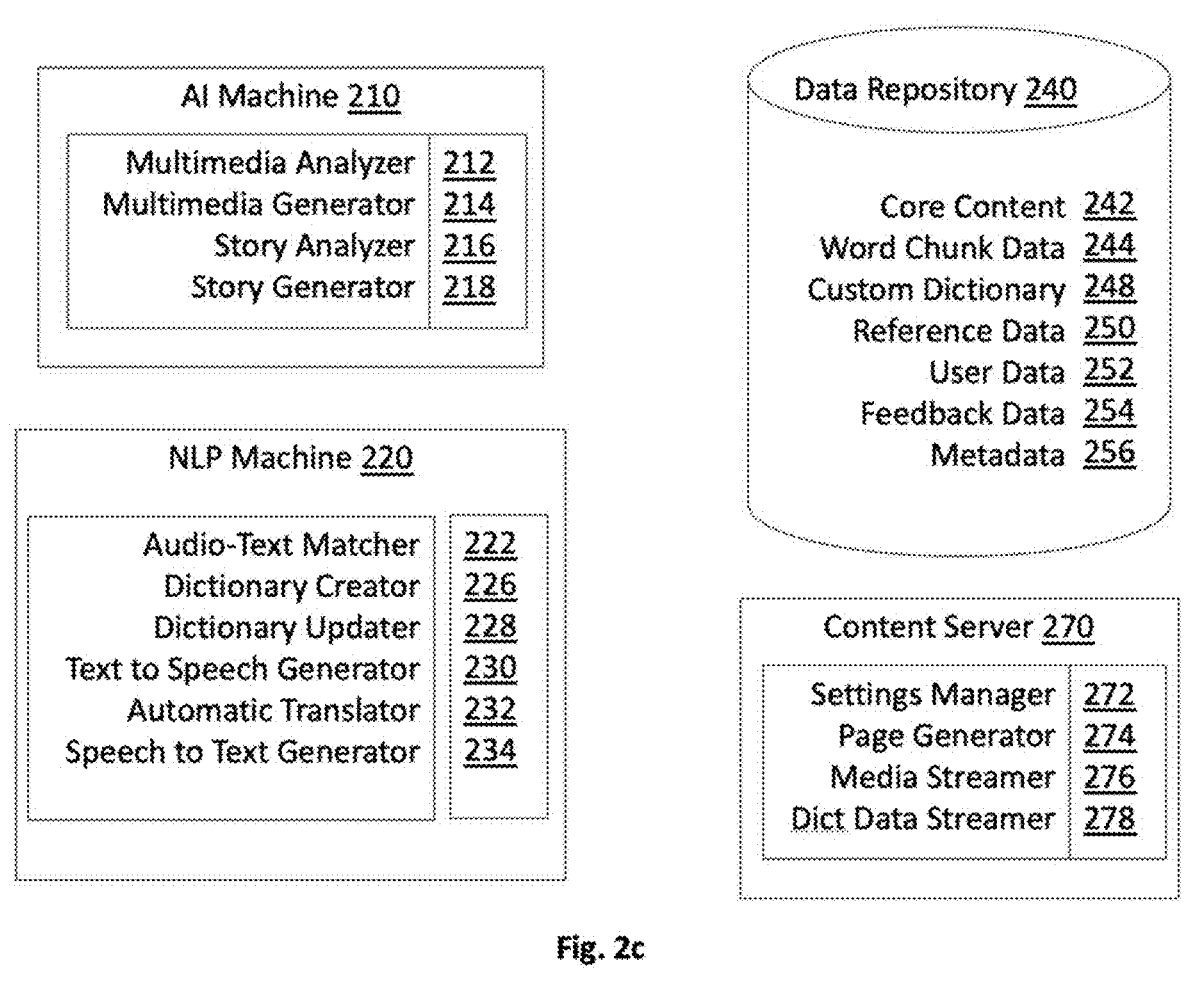

AI Machine 210

| Multimedia Analyzer | 212 |
| Multimedia Generator | 214 |
| Story Analyzer | 216 |
| Story Generator | 218 |

NLP Machine 220

| Audio-Text Matcher | 222 |
| Dictionary Creator | 226 |
| Dictionary Updater | 228 |
| Text to Speech Generator | 230 |
| Automatic Translator | 232 |
| Speech to Text Generator | 234 |

Data Repository 240

Core Content 242
Word Chunk Data 244
Custom Dictionary 248
Reference Data 250
User Data 252
Feedback Data 254
Metadata 256

Content Server 270

| Settings Manager | 272 |
| Page Generator | 274 |
| Media Streamer | 276 |
| Dict Data Streamer | 278 |

Fig. 2c

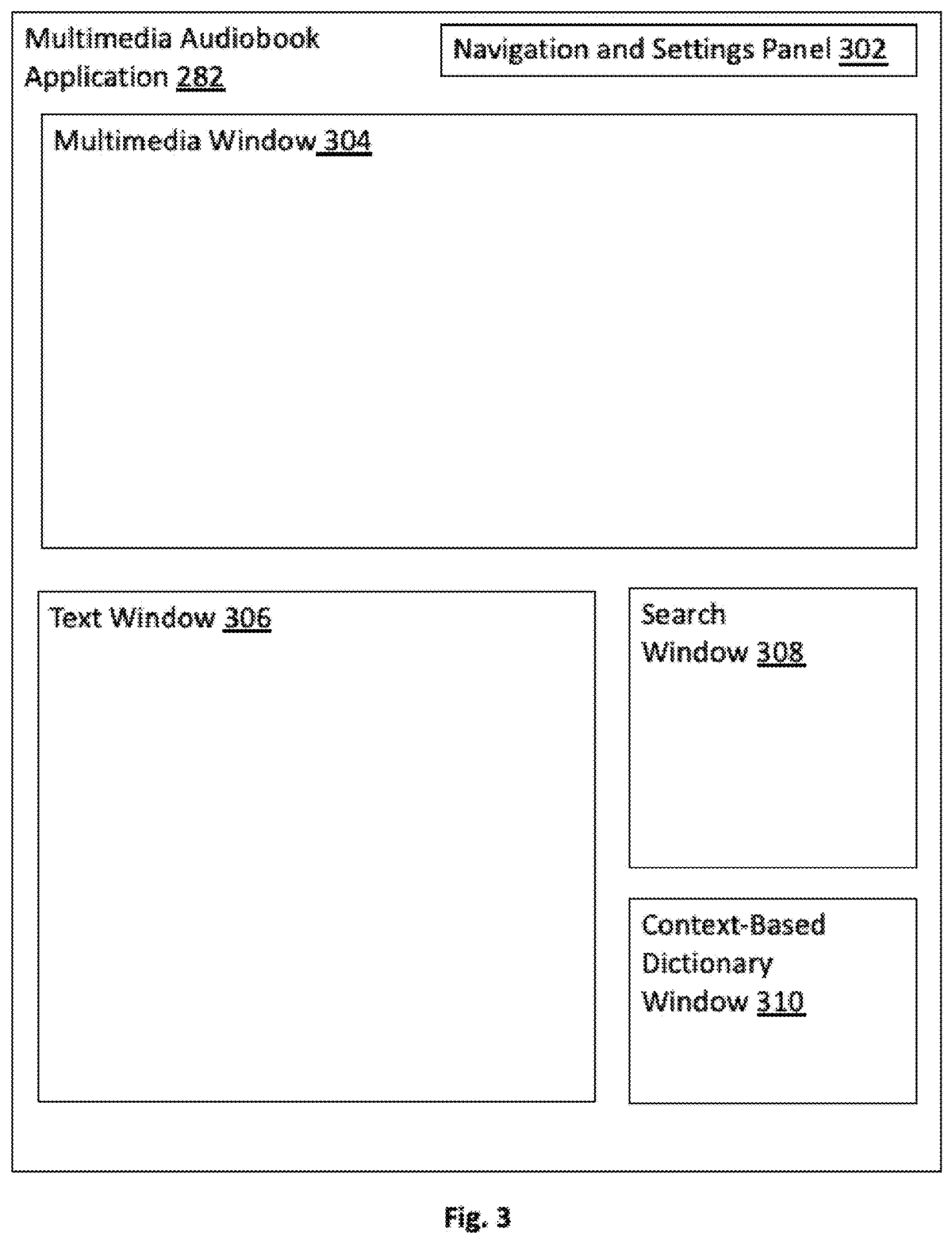

Multimedia Audiobook
Application 282

Navigation and Settings Panel 302

Multimedia Window 304

Text Window 306

Search
Window 308

Context-Based
Dictionary
Window 310

Fig. 3

Search Window 308

Text-Based Search 450

| Input 452 | Attribute (A) 454 |
| | Attribute (B) 456 |
| | · · · |
| | Attribute (N) 458 |

Multimedia Object-Based Search 460

| Input 462 | Attribute (A) 464 |
| | Attribute (B) 466 |
| | · · · |
| | Attribute (N) 468 |

Emotion-Based Search 470

| Input 472 | Attribute (A) 474 |
| | Attribute (B) 476 |
| | · · · |
| | Attribute (N) 478 |

· · ·

User-Defined Search 480

Input 482

Fig. 4b

Example Sentence Chunk 602

He ate a lot of greasy pizza, and then he went to bed.

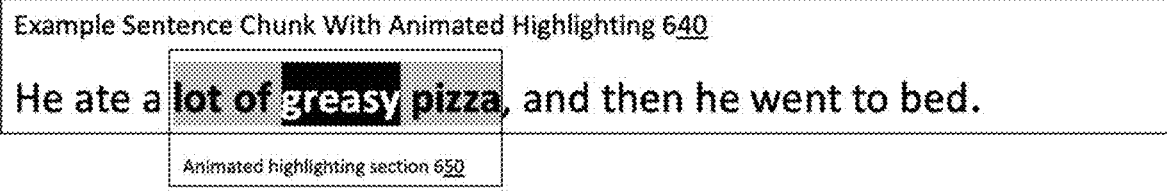

Example Sentence Chunk With Animated Highlighting 640

He ate a lot of greasy pizza, and then he went to bed.

Animated highlighting section 650

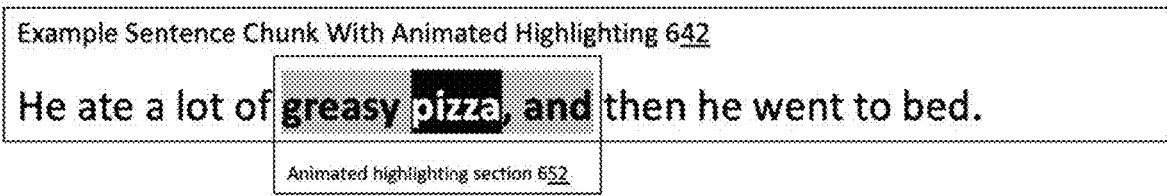

Example Sentence Chunk With Animated Highlighting 642

He ate a lot of greasy pizza, and then he went to bed.

Animated highlighting section 652

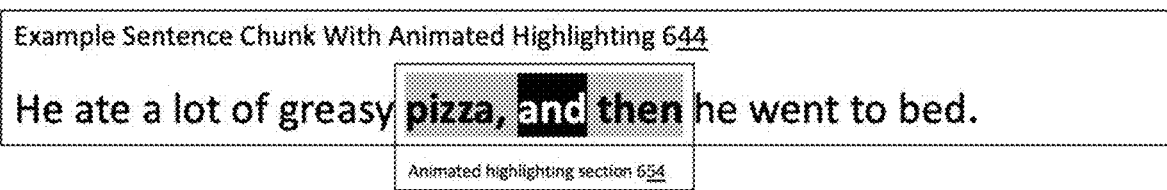

Example Sentence Chunk With Animated Highlighting 644

He ate a lot of greasy pizza, and then he went to bed.

Animated highlighting section 654

Fig. 6b

Analyze Multimedia and Text Data for Synchronizing 810

Generate Audio-to-Text on Multimedia Data 912

Match Original Text with Generated Text 914

Generate Character Offset and Timestamp Data
For Each Word Chunk 916

Store Word Chunk Data 820

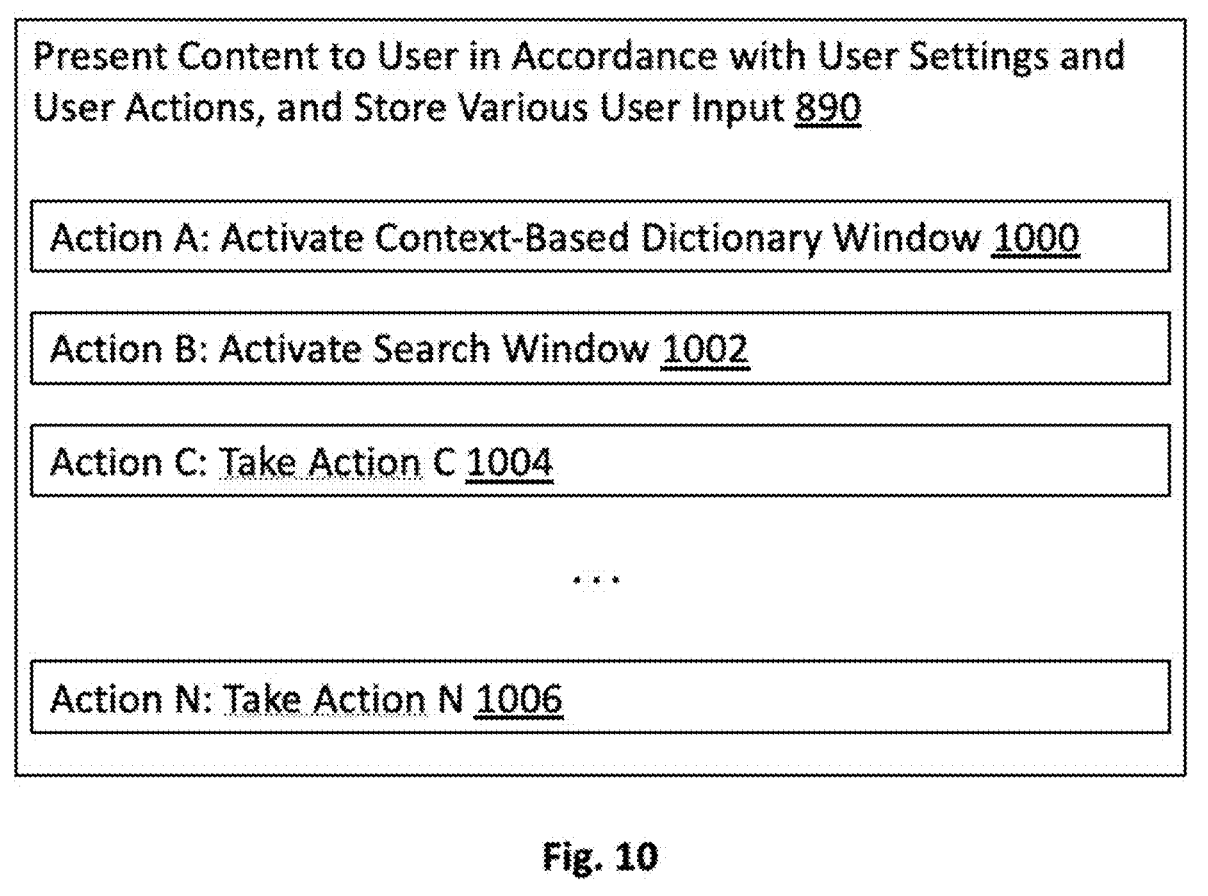

Present Content to User in Accordance with User Settings and User Actions, and Store Various User Input <u>890</u>

Action A: Activate Context-Based Dictionary Window <u>1000</u>

Action B: Activate Search Window <u>1002</u>

Action C: Take Action C <u>1004</u>

. . .

Action N: Take Action N <u>1006</u>

Fig. 10

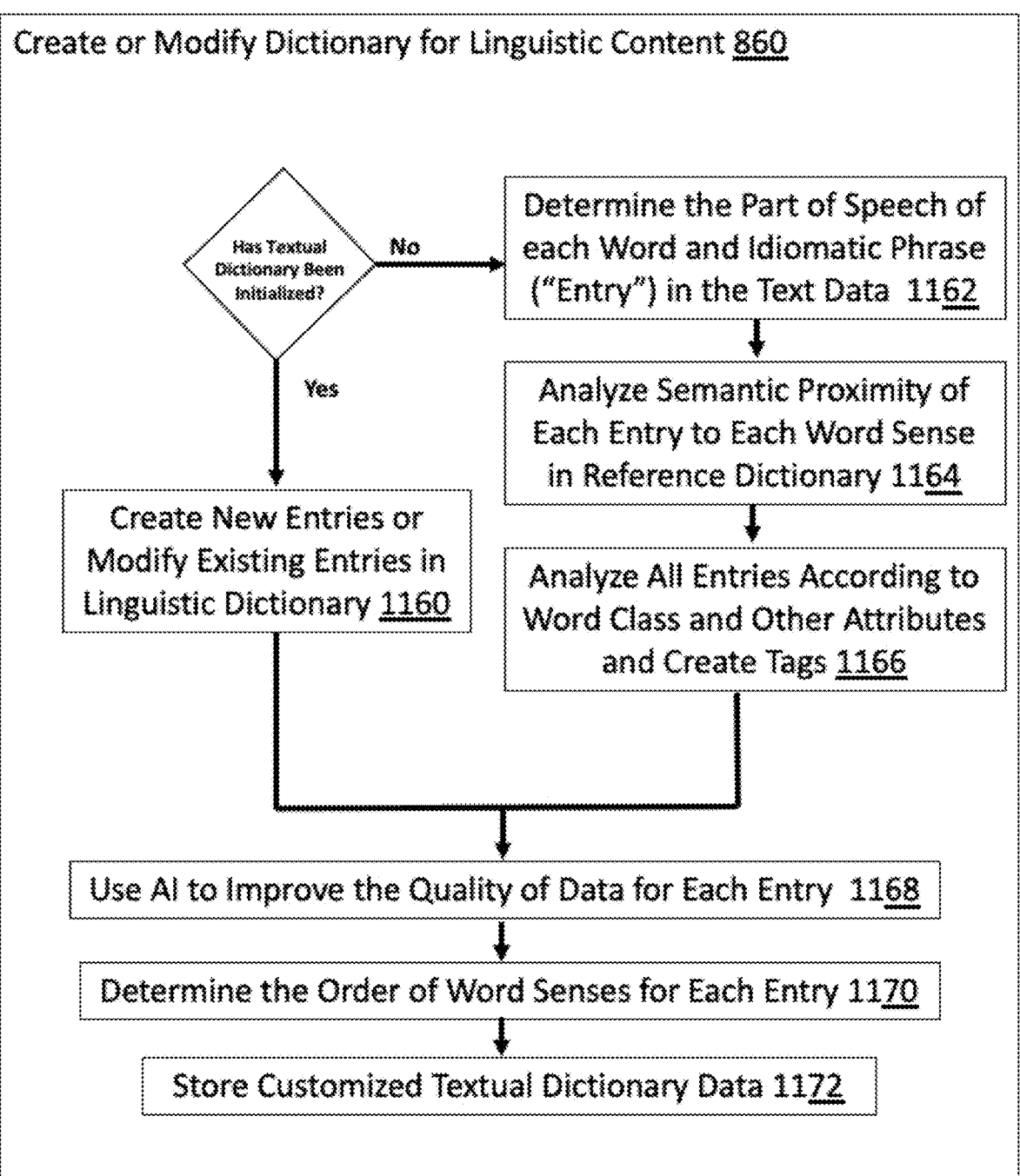

Create or Modify Dictionary for Linguistic Content 860

Has Textual Dictionary Been Initialized?

No → Determine the Part of Speech of each Word and Idiomatic Phrase ("Entry") in the Text Data 1162

Analyze Semantic Proximity of Each Entry to Each Word Sense in Reference Dictionary 1164

Analyze All Entries According to Word Class and Other Attributes and Create Tags 1166

Yes → Create New Entries or Modify Existing Entries in Linguistic Dictionary 1160

Use AI to Improve the Quality of Data for Each Entry 1168

Determine the Order of Word Senses for Each Entry 1170

Store Customized Textual Dictionary Data 1172

Fig. 11b

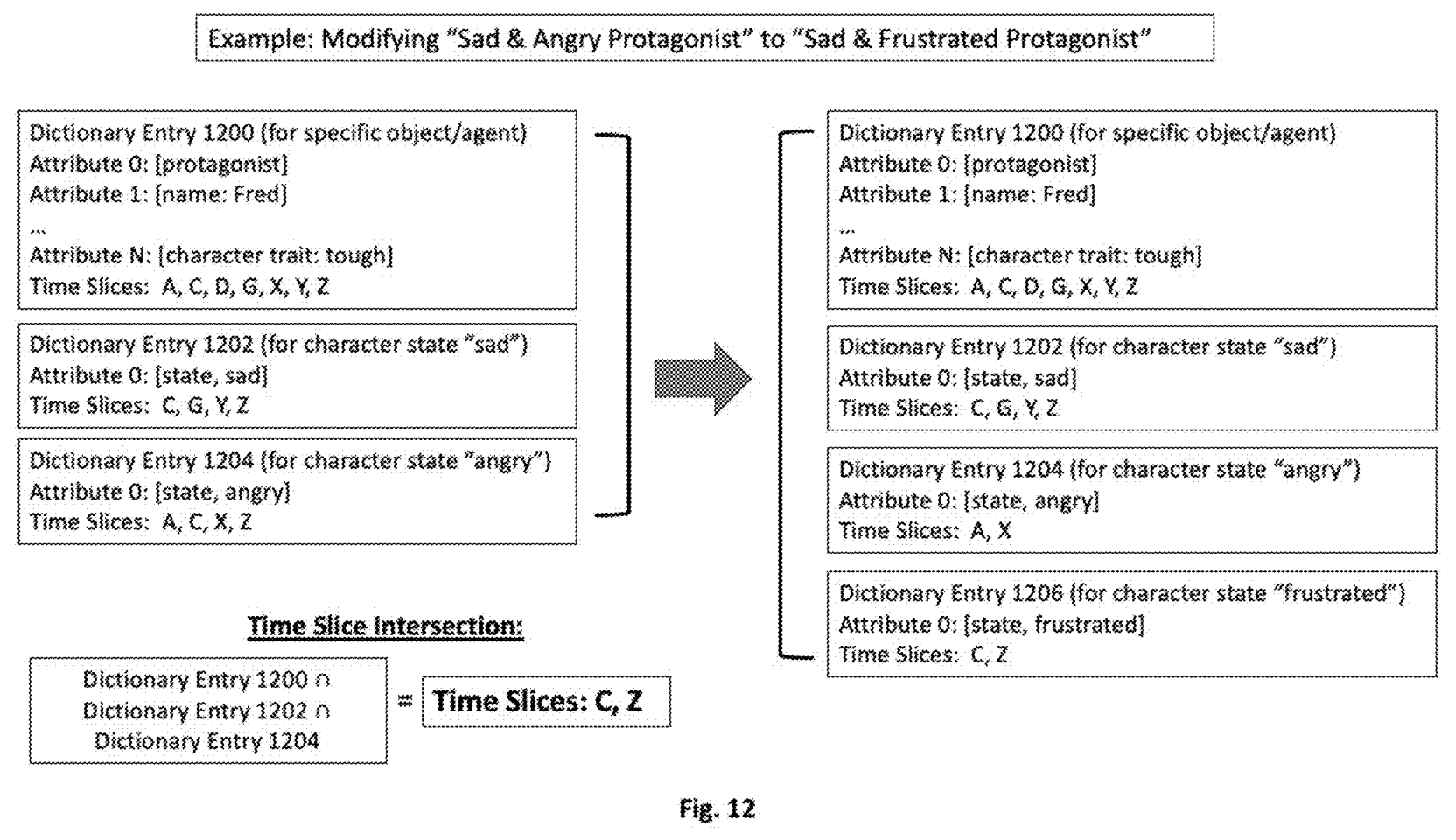

Example: Modifying "Sad & Angry Protagonist" to "Sad & Frustrated Protagonist"

Dictionary Entry 1200 (for specific object/agent)
Attribute 0: [protagonist]
Attribute 1: [name: Fred]
...
Attribute N: [character trait: tough]
Time Slices: A, C, D, G, X, Y, Z Dictionary Entry 1202 (for character state "sad")
Attribute 0: [state, sad]
Time Slices: C, G, Y, Z Dictionary Entry 1204 (for character state "angry")
Attribute 0: [state, angry]
Time Slices: A, X Dictionary Entry 1206 (for character state "frustrated")
Attribute 0: [state, frustrated]
Time Slices: C, Z Dictionary Entry 1200 (for specific object/agent)
Attribute 0: [protagonist]
Attribute 1: [name: Fred]
...
Attribute N: [character trait: tough]
Time Slices: A, C, D, G, X, Y, Z Dictionary Entry 1202 (for character state "sad")
Attribute 0: [state, sad]
Time Slices: C, G, Y, Z Dictionary Entry 1204 (for character state "angry")
Attribute 0: [state, angry]
Time Slices: A, C, X, Z Time Slice Intersection:

Dictionary Entry 1200 ∩
Dictionary Entry 1202 ∩
Dictionary Entry 1204

= Time Slices: C, Z

Fig. 12

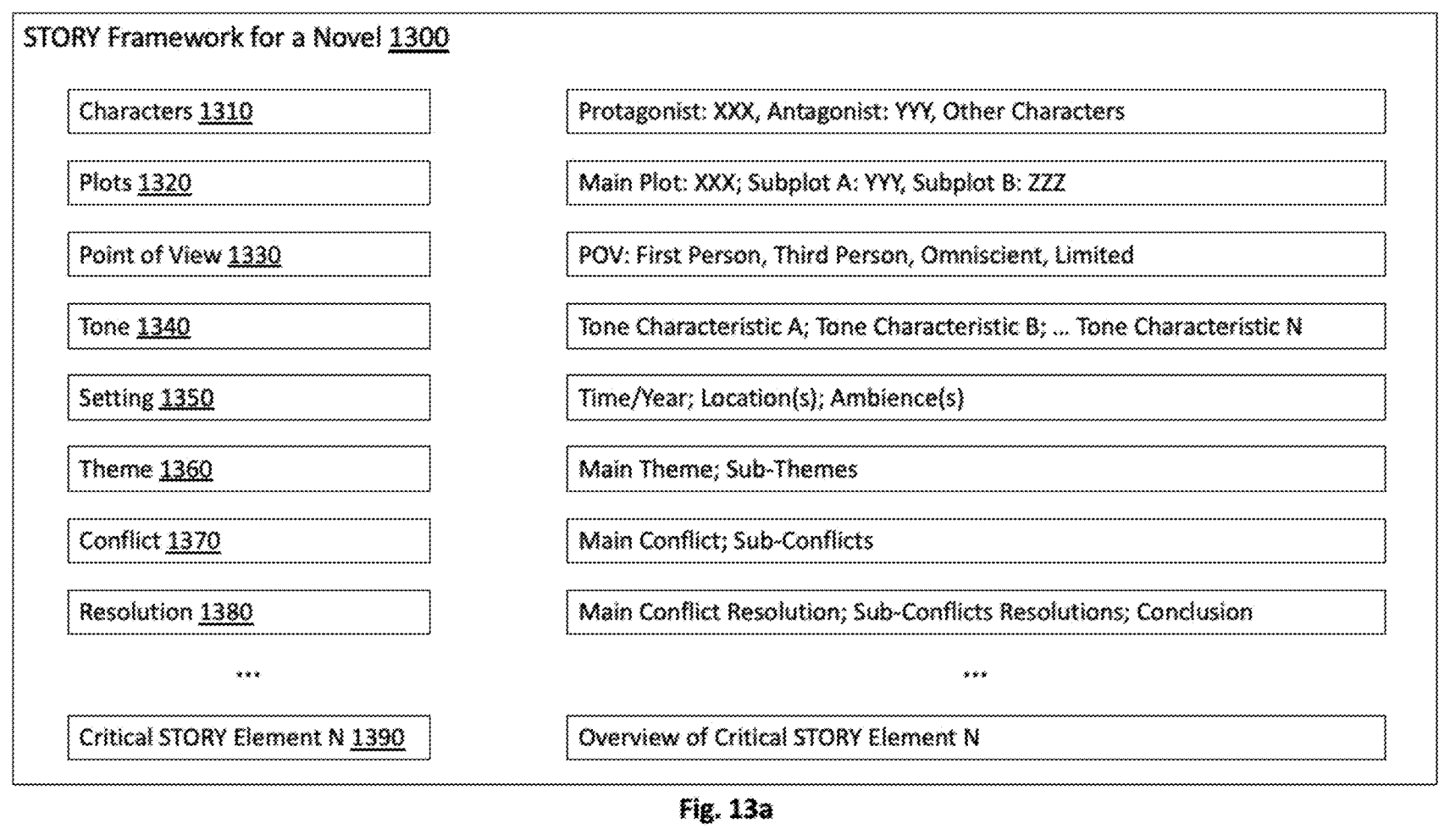

STORY Framework for a Novel 1300

Characters 1310 — Protagonist: XXX, Antagonist: YYY, Other Characters

Plots 1320 — Main Plot: XXX; Subplot A: YYY, Subplot B: ZZZ

Point of View 1330 — POV: First Person, Third Person, Omniscient, Limited

Tone 1340 — Tone Characteristic A; Tone Characteristic B; ... Tone Characteristic N Setting 1350 — Time/Year; Location(s); Ambience(s)

Theme 1360 — Main Theme; Sub-Themes

Conflict 1370 — Main Conflict; Sub-Conflicts

Resolution 1380 — Main Conflict Resolution; Sub-Conflicts Resolutions; Conclusion

· · ·

Critical STORY Element N 1390 — Overview of Critical STORY Element N

Fig. 13a

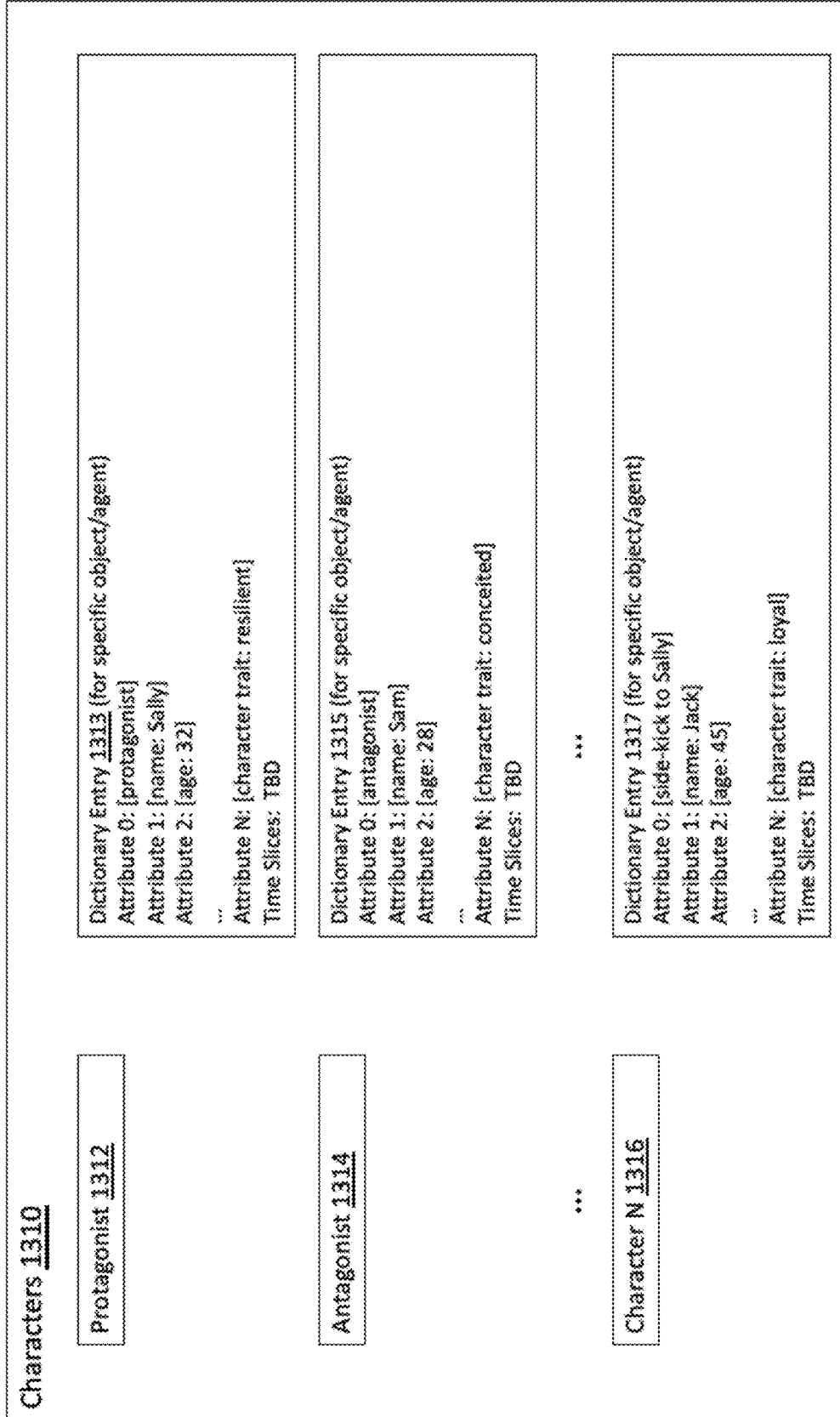

Characters 1310

Protagonist 1312

Dictionary Entry 1313 (for specific object/agent)
Attribute 0: [protagonist]
Attribute 1: [name: Sally]
Attribute 2: [age: 32]
...
Attribute N: [character trait: resilient]
Time Slices: TBD

Antagonist 1314

Dictionary Entry 1315 (for specific object/agent)
Attribute 0: [antagonist]
Attribute 1: [name: Sam]
Attribute 2: [age: 28]
...
Attribute N: [character trait: conceited]
Time Slices: TBD

...

Character N 1316

Dictionary Entry 1317 (for specific object/agent)
Attribute 0: [side-kick to Sally]
Attribute 1: [name: Jack]
Attribute 2: [age: 45]
...
Attribute N: [character trait: loyal]
Time Slices: TBD

Fig. 13b

CONTEXT-BASED DICTIONARIES FOR MULTIMEDIA AUDIOBOOK SYSTEMS INCLUDING LINGUISTIC DICTIONARY ENTRIES

CROSS-REFERENCE TO RELATED APPLICATIONS

This application is a continuation of U.S. patent application Ser. No. 18/458,859 filed on Aug. 30, 2023, which is incorporated by reference herein.

BACKGROUND

Technical Field

This disclosure relates to context-based dictionaries used in a multimedia audiobook system.

Description of the Related Art

Current ebooks, audiobooks, video players, and, more generally, multimedia players and systems may provide dictionaries to explain words contained in the multimedia content, presenting such general information as the word entry's pronunciation, part of speech, and meaning. The electronic dictionaries that accompany multimedia audiobooks are typically like conventional dictionaries in terms of the informational content of the dictionary entries.

SUMMARY

A method, non-transitory computer-readable storage medium and system is disclosed for creating and using context-based dictionaries for multimedia content. Context-based dictionaries contain entries based on linguistic and non-linguistic information and are defined by tags, words, phrases, descriptions, environments, emotions, sentiments, multimedia objects or content, or other relevant attributes. The multimedia system in which context-based dictionaries are used retrieves original content, analyzes and processes it, and presents to the user synchronized multimedia content and text content. The system creates dictionaries containing word definitions and information that have been customized according to context; in addition, it creates linguistic and non-linguistic attributes that enable and enhance searching functions; moreover, it enables modification of the dictionary entries through a feedback loop that may include input from human users and artificial intelligence programs.

BRIEF DESCRIPTION OF DRAWINGS

FIG. 1a shows an example of a linguistic context-based dictionary.

FIG. 1b shows an example of a non-linguistic context-based dictionary.

FIG. 2c shows sub-systems of components in FIGS. 2a and 2b.

FIG. 3 is a simplified diagram of an example embodiment of a user device screen showing the main functional components of the system as experienced by a user.

FIG. 4b shows an example embodiment of the search window.

FIG. 6b illustrates an example embodiment of animated highlighted text that is synchronized with corresponding multimedia content.

FIG. 10 shows an example embodiment of main loop actions in presenting content to a user.

FIG. 11b shows an example embodiment detailing the dictionary creation and modification processes for linguistic content.

FIG. 12 shows an example embodiment of modifying context-based dictionary entries.

FIG. 13a shows an embodiment of an example STORY framework for a novel.

FIG. 13b shows an embodiment of an example set of characters for a novel.

DETAILED DESCRIPTION

Figure 2A:
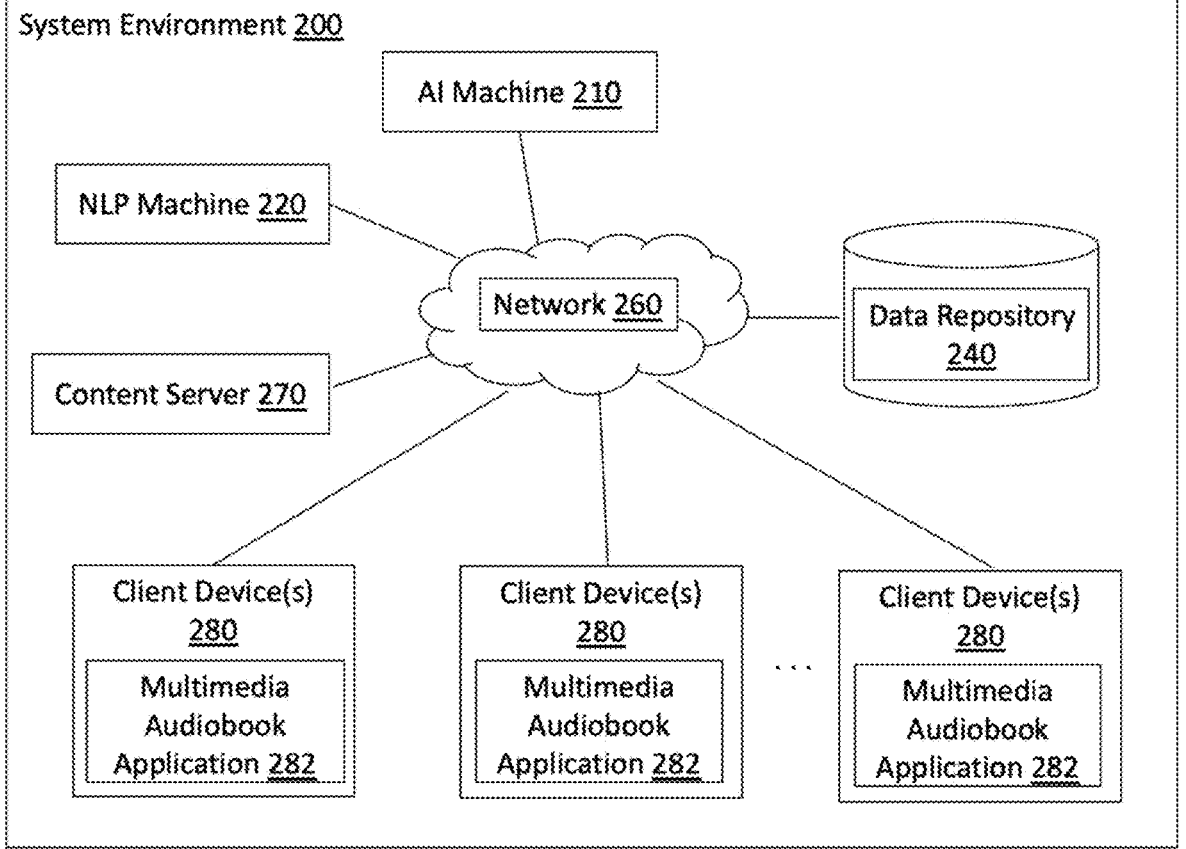
FIG. 2a shows top-level components in an example embodiment context-based dictionary for a multimedia audiobook system.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Dictionaries can trace their beginnings back to bilingual Sumerian-Akkadian wordlists written in cuneiform, preserved in clay tablets in ancient Mesopotamia. In the English world, monolingual dictionaries have existed for over 400 years and have served as a reference for contemporary readers and writers and later as a chronicle of word usage at the point in time of their publication. Modern online dictionaries, both monolingual and multilingual, including those that are embedded within media applications, typically present multiple definitions for a single word. Dictionaries are generally comprised of lists of word entries with definitions, explanations, and examples that help the dictionary user understand the meaning and usage of the word entries.

Below is an example of what a conventional online dictionary may look like in presenting the entry for "record":

Sample Content:

"Record the new world record in the record books!"

Conventional Dictionary Window for the Word "record":

record

1. Noun /'rɛːk ɔ rd/—A document serving as evidence, proof, or reference of an event, transaction, or occurrence.
2. Noun /'rɛːk ɔ rd/—The highest achievement in a field or category, officially recognized and documented.
3. Noun /'rɛːk ɔ rd/—A flat, grooved disc used for storing and playing sound or music on a turntable.
4. Verb /rɪ'k ɔ : rd/—To officially document or make an entry of information.
5. Verb /rɪ'k ɔ : rd/—To capture, store, or save data or information using audio or video equipment.
6. Adjectival Noun/'rɛk ɔ :rd/—Of the highest achievement in a field or category, officially recognized and documented. (Used to modify a noun, like definition 2.)

In the above example sentence, "Record the new world record in the record books!", there are three instances of the word "record". A current-day application that embeds an online dictionary might display a dictionary window with all the various definitions regardless of which instance of "record" the user has selected to look up. The user would have to look through the various definitions and decide which one is the most appropriate for a particular instance.

Context-based dictionaries described herein are comprised of entries that are customized for the specific context in which they occur. Context-based dictionaries may contain entries defined using tags, words, phrases, descriptions, environments, emotions, sentiments, multimedia objects or content, and other relevant contextual attributes. "Multimedia content" or "non-linguistic content" herein may refer to content that can be perceived by auditory, visual, haptic, olfactory means, including but not limited to audio, visual, holographic, and visual-reality media forms. Herein, the terms "tag" and "attribute" do not imply any particular data structure or implementation; some of these will be mentioned as possible embodiments in the following sections. When a context-based dictionary entry is presented to a user, the system has already determined the best definition for the instance the user is interested in and therefore does not confuse the user with extraneous and irrelevant information. Of course, if a user desires to peruse the various meanings of a particular entry, an embodiment of the system could be designed so that an entry's meanings are ordered by relevance or frequency or some other criterion or presented in some other intuitive manner.

The existence of a context-based dictionary implies the existence of corresponding content, which we will call "story" ("STORY"), and which may take the form of a book, an audio recording, an eBook, an audiobook, a video, a hologram, a virtual reality environment or some other physical or electronic instantiation.

For explanatory purposes, context-based dictionaries may be logically divided into two basic categories:
1) Linguistic dictionaries, in which a dictionary entry is specified by (a) a word or phrase occurring in the STORY, (b) various attributes of the entry, including part of speech, pronunciation, meaning, foreign language glosses and definitions, word class, etc., and (c) the position of the entry within the STORY, and
2) Non-linguistic dictionaries, in which a dictionary entry is specified by (a) a main attribute (in FIG. 1b "Attribute 0") describing an object or an element in, or a characteristic of a portion of the STORY, (b) zero or more other attributes of the entry, which for physical object entries, for example, may include their physical description and various other information, and (c) the position of such entry within the STORY.

The categories and various elements described above and shown in FIG. 1b are illustrative of a possible embodiment; however, other embodiments may use a different classification system and implementation. For example, in various embodiments, linguistic and non-linguistic dictionaries may be combined or they may be divided into further categories; each entry may contain multiple attributes defining the entry or may contain only a single attribute; the storing of entries may be implemented using hashing techniques, database structures, flat files, or other means; searching and accessing dictionary entries may be implemented by using any of various techniques including hashing functions, set functions, Boolean operations, or other computational operations. Core to the system, however, is the notion that a context-based dictionary contains entries and information that are defined in terms of their context in a STORY. Indeed, a STORY may itself be described by the entries in its dictionaries, which, in theory, may contain an infinite amount of information. As the number of context-based dictionary entries that defines a STORY increases, the definition of the STORY becomes better defined, and as that number approaches infinity, which is logically but not practically possible, the STORY may be considered completely defined; this may be considered analogous to the mathematical approach in calculus to defining the area under a curve, by which using more and more measurements we approach a more accurate calculation of the area.

FIGS. 1a and 1b show examples of an embodiment of linguistic and non-linguistic dictionary entries. They are intended to be exemplary and explanatory and are not intended to be complete or to indicate a preferred embodiment.

In an embodiment, the position of entries in both linguistic dictionaries and non-linguistic dictionaries may be specified by beginning and ending byte offsets into a file comprising the STORY, time-based measurements that indicate position in the STORY, percentage-based measurements that indicate relative position to the beginning and end of the STORY, or any other method that unambiguously specifies the position of the entry in the STORY.

In FIG. 1a, Story-X text 102 is an example of a one-sentence long STORY. A STORY could, of course, be comprised of hundreds or thousands of sentences, as is the case with a typical novel, audiobook, or movie, for example. Dictionary entry 104 defines the first occurrence of the word "record": its position is characters 0-5; it is a verb; it is pronounced /rɪ'k ɔ :rd/ with stress on the second syllable; it can be translated as "yyyyy" in Language Y; and so on. Dictionary entry 106 defines the second occurrence of "record," and dictionary entry 108 defines the last occurrence. The example here shows a limited number of attributes for each entry, but in other embodiments, there may be many additional attributes for each entry, including but not limited to foreign language glosses, example sentences, word class information, grammatical information, and other attributes that may contain generic or context-based information.

FIG. 1b illustrates several dictionary entry examples in an embodiment of a non-linguistic context-based dictionary. In this example, dictionary entry 110 specifies a specific object "shoes" that occurs in the STORY. These may be, for example, a particular pair of shoes sometimes worn by the protagonist in the STORY. Attribute 0 indicates that these shoes are a specific instance that appears in the STORY, attributes 1-3 indicate that the shoes are red, women's size 5, and made of leather, and the "positions" attribute indicates the positions in the STORY file(s) where this object appears.

Dictionary entry 112 is a generic instance of shoes, with the attributes 1-3 indicating that they may be any color, small, and made of leather or rubber. Shoes that match these attributes appear in the STORY in the positions indicated in the position attribute.

Dictionary entry 114 is an example of a generic location descriptor "outdoors". One might imagine a specific location descriptor such as "lobby of Caesar's Palace, Las Vegas".

Dictionary entry 116 is an example of an ambiance descriptor that denotes all "scary" scenes in STORY.

Dictionary entry 118 is an example of a specific event, a dinner party that took place in STORY.

Dictionary entry 120 is an example of a user-defined entry, which defines an entry that may be used to find scenes in STORY that fulfill an intersection of all the attributes listed, that is, scenes in which the protagonist appears wearing small shoes. Similarly, dictionary entry 122 defines scenes in STORY that are joyous, humid, indoors and at the dinner party.

As illustrated through the preceding examples, non-linguistic context-based dictionary entries can have an arbitrary number of attributes, and the combinations of attributes, either by union or intersection, can lead to an unlimited number of dictionary entries. In an embodiment, it may be useful to initialize a non-linguistic context-based dictionary with a predefined set of common attributes that are known to be useful. Usefulness here may be determined by the system itself, taking into consideration the behavior of previous users. In another embodiment, a non-linguistic context-based dictionary could be populated with entries in an on-demand process; that is, an entry or a set of entries could be created and stored in the dictionary each time a user specifies a search using a certain set of attributes.

An embodiment of a system that functions as a multimedia system using context-based dictionaries may take as input one or more text files, audio and multimedia files as well as reference data files and metadata about the content, process such input and enable searching of such data by users. The text, audio and multimedia input are referred to variously in the description herein as text files, audio and multimedia files, or as text data, audio data and multimedia data. These data are processed by the system in order to synchronize the text and audio or multimedia content. These data may be stored in a database or a repository file and later accessed when needed by the system. A customized dictionary, comprising two parts, a linguistic dictionary and a non-linguistic dictionary, may be created, stored, and later modified using a user feedback loop. The linguistic dictionary is based on the words and phrases and their context in the textual input data, and the non-linguistic dictionary is based on the non-linguistic components and their context in the multimedia input data.

Embodiments of the system that enable searching of the input data may be based upon linguistic or non-linguistic context.

Linguistic search may be as simple as a "traditional" search for a string of characters, may include a search for classes of words, such as proper nouns, place names, foreign loan words, synonyms, words with similar pronunciations, or may include a search for words that are specified by a preset attribute, a system-generated attribute, or a user-generated attribute. The result of a linguistic search is a list of zero or more strings representing data within the input text data, each element of the list having a corresponding time slice counterpart mapping to its position in the multimedia input data. Herein, "time slice" is used interchangeably with the term "positional information", neither of which is intended to imply a particular embodiment or implementation; in fact, in various embodiments, such information could be detected and stored using various methods and data structures, as explained earlier as well as in the following section.

Non-linguistic search enables a user to search through multimedia content for inanimate and animate objects, various conditions and ambiances of scenes and settings, as well as machine-generated and user-defined attributes. The result of a non-linguistic search is a list of zero or more time slices indicating position of the relevant content in a multimedia input data file. In an embodiment, time slices, or "positional information", may be indicated, for example, by time units such as milliseconds, by position of bits, bytes, or other well-defined units, by percentage-based measurements that indicate relative position to the beginning and end of the STORY or any other method that identifies the relevant content in an unambiguous manner. Each element in the non-linguistic search results list has a corresponding text string mapped to its position in the text input data.

FIG. 2*a* is a high-level block diagram illustrating a system environment 200, an example embodiment of a multimedia system using context-based dictionaries. The system environment 200 comprises an artificial intelligence (AI) machine 210, natural language processing (NLP) machine 220, a content server 270, a data repository 240, and various client devices 280; however, other embodiments may include different numbers of machines 210, 220, 240, 270 and client devices 280 along with multimedia audiobook applications 282 and various configurations of those machines. Furthermore, the system environment 200 may include different or additional entities.

The network 260 represents the communication pathways between the AI machine 210, the NLP machine 220, the content server 270, the data repository 240, and the client devices 280 on which the multimedia audiobook applications 282 may be executed. In one embodiment, the network 260 includes the Internet.

The network 260 can also utilize dedicated or private communications links that are not necessarily part of the Internet, such as private enterprise networks. In one embodiment, the network 260 uses standard communications technologies and/or protocols. In addition, all or some of the links can be encrypted using conventional encryption technologies such as the secure sockets layer (SSL), Secure HTTP, and/or virtual private networks (VPNs). In another embodiment, the entities can use custom and/or dedicated data communications technologies instead of, or in addition to, the ones described above.

Each client 280 comprises one or more computing devices capable of processing data and communicating with the network 260. For example, a client device 280 may be a desktop computer, a laptop computer, a smartphone, a tablet computing device, a dedicated reading device, or any other device having computing, displaying, audio playing, and/or data communication capabilities. Each client 280 includes a processor for manipulating and processing data and a non-transitory computer-readable storage medium for storing data and program instructions associated with various applications. Various executable programs may be embodied as computer-executable instructions stored in the non-transitory computer-readable storage medium. The instructions, when executed by the processor, cause the client 280 and the multimedia audiobook application 282 to perform the functions attributed to the programs described herein.

The AI machine 210, the NLP machine 220, the content server 270, and the data repository 240 ("The Servers") are computer systems that process data and communicate with other devices via the network 260. The Servers may be comprised of a singular computing system, such as a single computer, or a network of computing systems, such as a data center or a distributed computing system, or some combination of these.

In an embodiment, The Servers provide information or prepare information to send to a client 280. For example, The Servers may be file servers, application servers, data storage servers that process data and provide content, including text, audio, video and other data, for viewing on clients 280 via the multimedia audiobook application 282. The Servers may receive requests for data from the clients 280 and respond by transmitting the requested data to the clients 280. Like the clients 280, The Servers may execute one or more applications to carry out the functions attributed to The Servers herein.

Figure 2B:
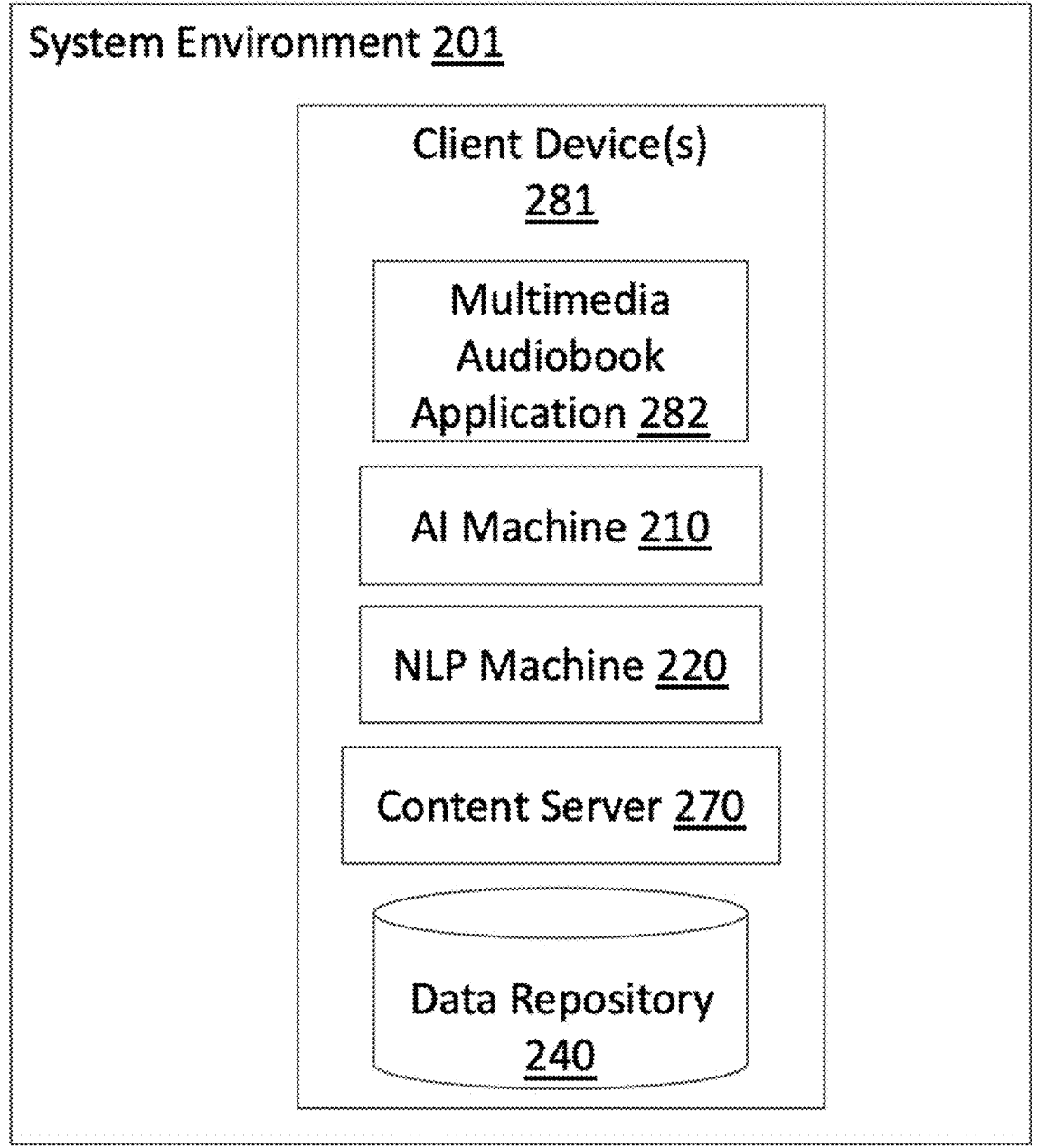
FIG. 2b shows top-level components in an alternative example embodiment in which computation for the system is executed on the client device.

FIG. 2b is a high-level block diagram illustrating a system environment 201, an example embodiment of a multimedia system using context-based dictionaries. The functionality of the system environment 201 is like that of the system environment 200. The main difference between FIG. 2a and FIG. 2b is whether the various functions of the system are performed on a server or on a client. The system environment 201 comprises an artificial intelligence (AI) machine 210, natural language processing (NLP) machine 220, a content server 270, a data repository 240, which all reside on one or more client devices 281 along with the multimedia audiobook application 282; however, other embodiments may include different numbers of machines and client devices and various configurations of those machines and programs either executing on the client device 281 or independently of the client device 281. Furthermore, the system environment 201 may include different or additional machines.

FIG. 2c illustrates an example embodiment of an AI Machine 210, an NLP Machine 220, a Content Server 270, and a Data Repository 240.

The general flow of data through the system in an embodiment may be as follows: the system receives as input, text and multimedia data, which represent the main content, herein called core content 242. The system may also receive metadata 256, which is information about the core content 242, and store it in the data repository 240. Initially, the system checks for the existence of certain input files, and if absent, it may create them based on existing input files.

For example, if the input data contains a text file but no accompanying multimedia file, the text-to-speech generator 230 and the multimedia generator 214 can be used to create a multimedia file that converts the input text to audio and creates video content that is compatible with the text input file. If the input data contains a multimedia file but no accompanying text file, the speech-to-text generator 234, and optionally the story generator 218, can be used to create the input text file, which is a transcription of the audio portion of the multimedia file. These data are stored in the data repository 240 as core content 242.

If the input data does not contain certain translated files, the automatic translator 232 and the text-to-speech generator 230 may be used to create text and audio files for the translations, which may be later used in providing closed captioning or dubbing. These data are stored in the data repository 240 as core content 242.

Figure 8:
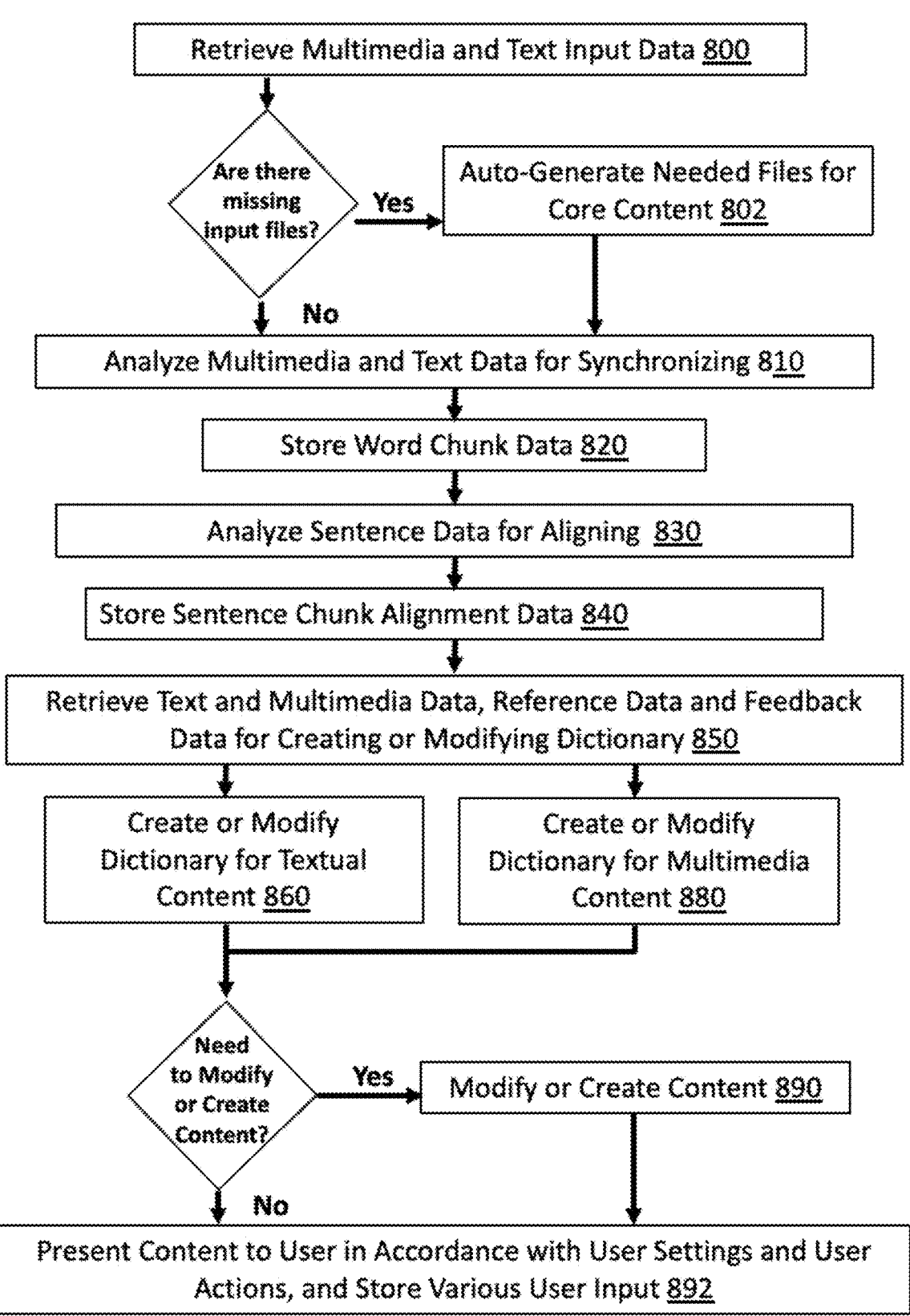
FIG. 8 shows top-level processes in an example embodiment of a multimedia audiobook system using context-based dictionaries.
Figure 11A:
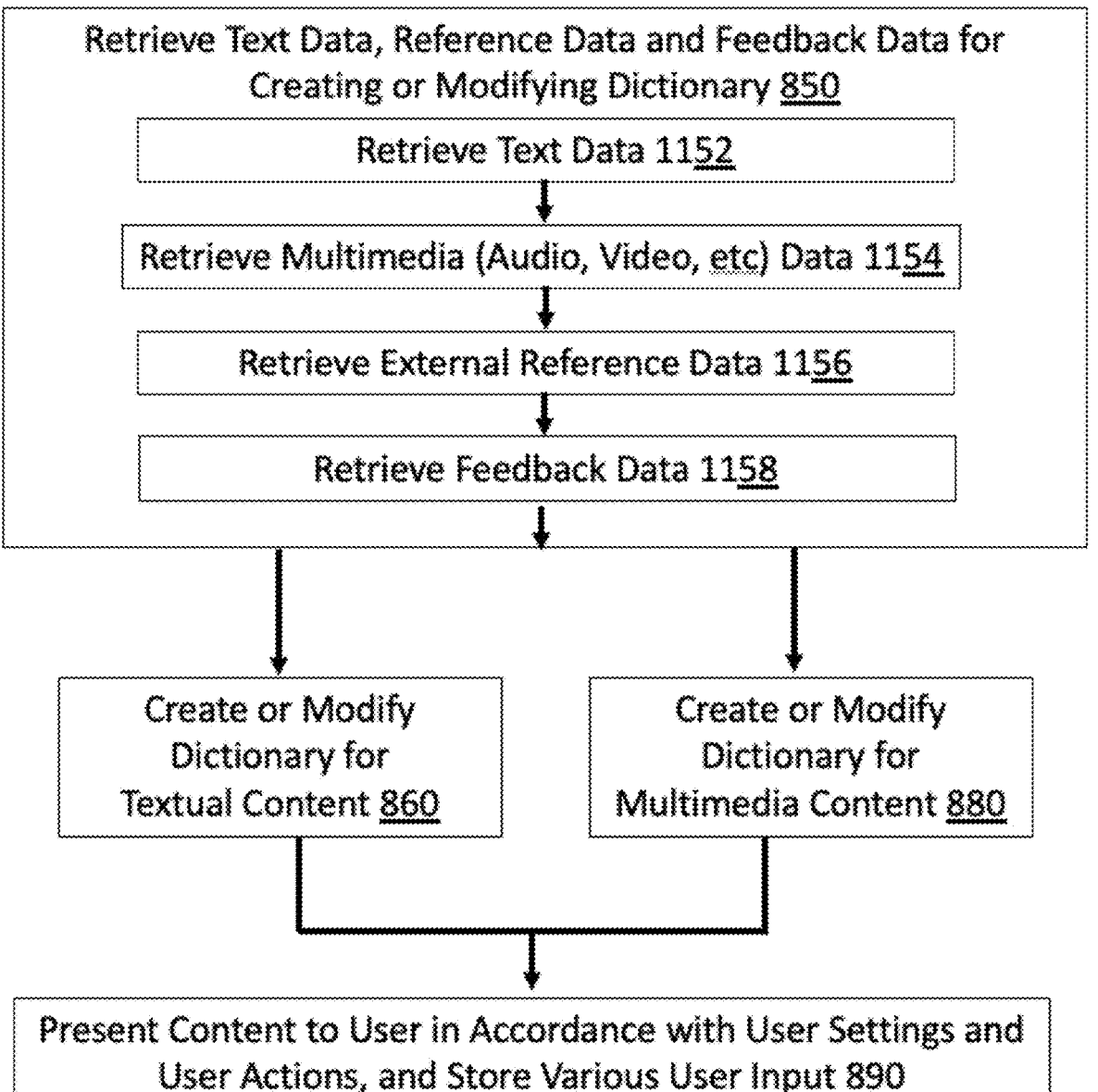
FIG. 11a shows an example embodiment of the dictionary creation and modification processes listed in FIG. 8.
Figure 11C:
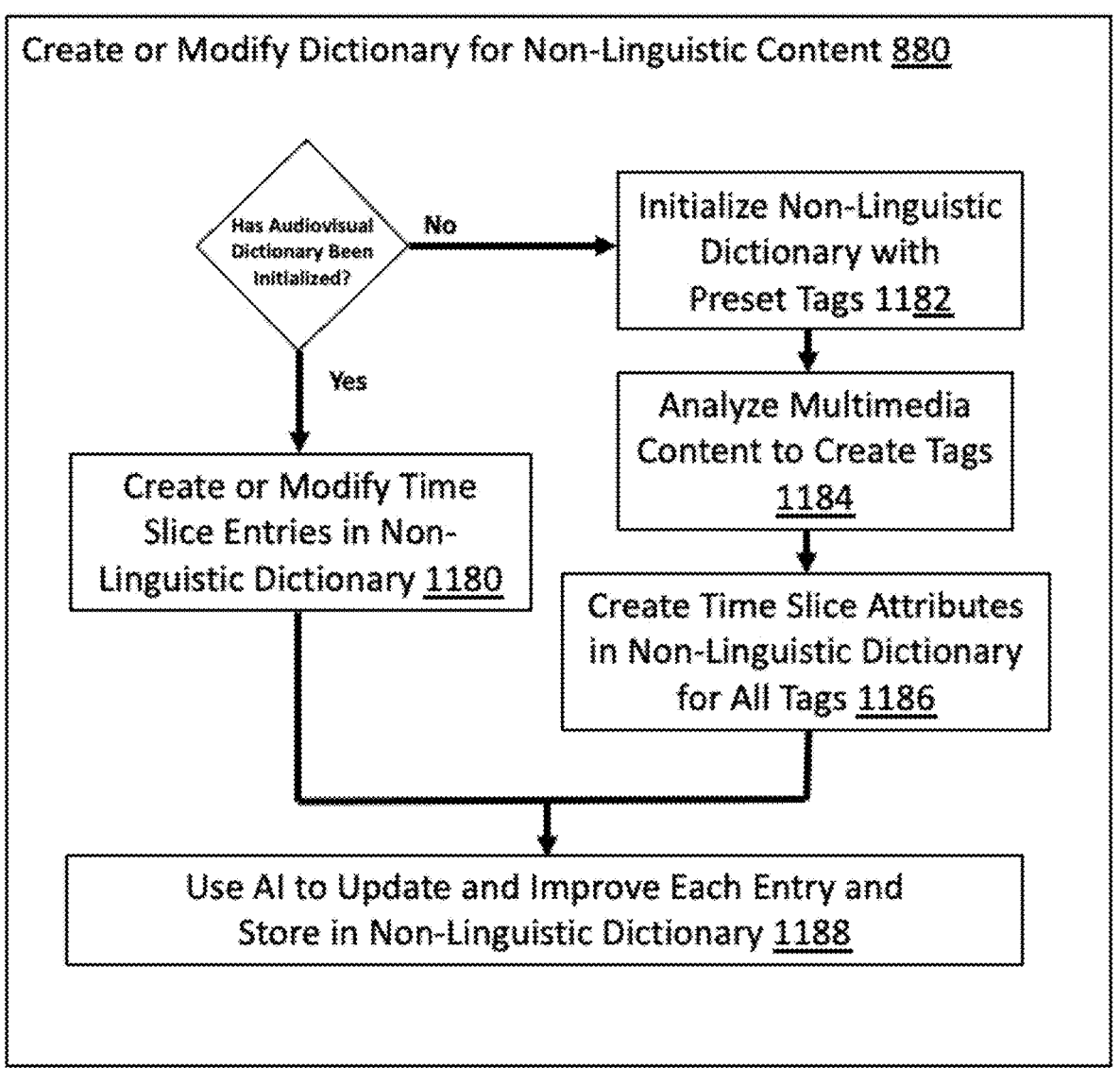
FIG. 11c shows an embodiment detailing an example of dictionary entry creation and modification for multimedia content.

The multimedia analyzer 212 and story analyzer 216 may be used in creating custom dictionaries, referred to in the description of FIG. 8 and described in more detail in the description of FIG. 11c.

Figure 6A:
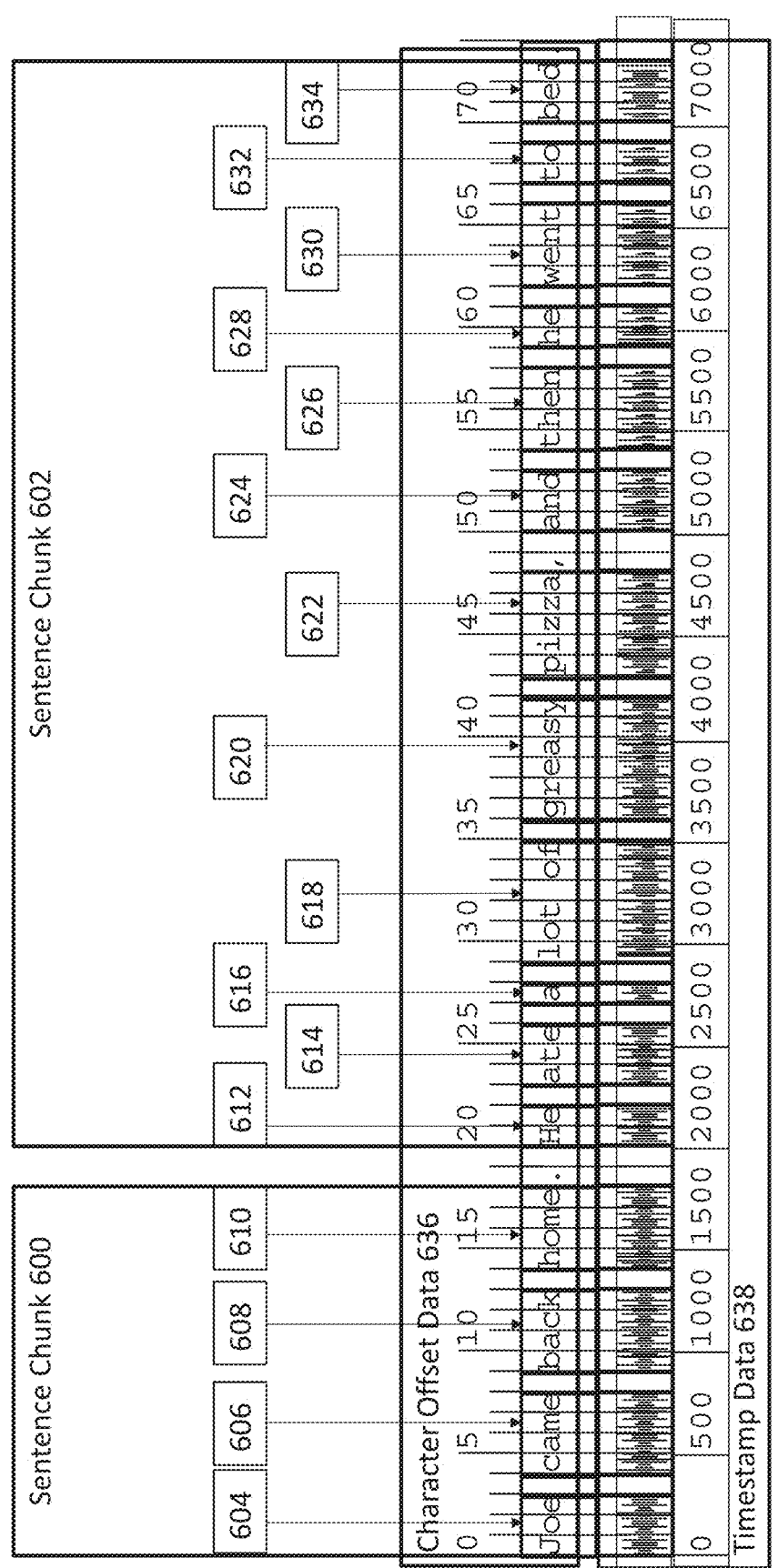
FIG. 6a illustrates an example embodiment of word chunks, sentence chunks and how they might be calculated.

Next, the core content data 242 are processed by the audio-text matcher 222, and the results are stored back into the data repository 240 as word chunk data 244, which is used for synchronizing text and audio, described in more detail in the descriptions for FIGS. 6a and 6b. The context-based dictionaries 248 may be created and updated using reference data 250 as well as other outside data, using the NLP machine 220 dictionary creator 226 and dictionary updater 228 and the AI machine 210 to analyze the words and idioms and their context; the result is stored in the data repository 240 context-based dictionaries 248. Once the core content 242, the word chunk data 244, and the context-based dictionaries 248 have been stored in the data repository 240, the system is then ready to present data to a human user via the multimedia audiobook application 282 on the client device 280. The page generator 274 of the content server 270 takes as input data stored in the data repository 240, creates pages to be displayed, and sends them via the media streamer 276 to the client device 280. If the human user accesses the dictionary when consuming content on the client device 280 of the multimedia audiobook application 282 on the client device 280 may retrieve dictionary data from the content server 270 dictionary data streamer 278 to present in the multimedia audiobook application 282.

The AI Machine 210 may be comprised of a multimedia analyzer 212 and a story analyzer 216, which may be used in creating custom dictionaries used to search multimedia data, a multimedia generator 214 and a story generator, which may be used to generate "missing" core data or to produce new content.

The NLP Machine 220 may be comprised of an audio-text matcher 222, a dictionary creator 226, a dictionary updater 228, a text-to-speech generator 230, an automatic translator 232, and a speech-to-text generator 234. The audio-text matcher 222 analyzes the audio and text in the core content 242 and calculates the character offset values for words and phrases in the text file that correspond to the timestamp values of those words and phrases in the audio file, and stores the results in the data repository 240 under word chunk data 244. If the text and audio data in the core content 242 do not include timestamp values indicating the beginning and ending times for the words in the audio file, the audio-text matcher 222 can analyze the audio file using a speech-to-text function to generate such timestamp values. The audio-text matcher 222 can then use this data to match the words in the original text file of the original data 242 and provide corresponding timestamp values for the words, which are then stored in the data repository 240 under word chunk data 244.

The Data Repository 240 is comprised of core content 242, word chunk data 244, custom dictionaries 248, reference data 250, user data 252, feedback data 254, and metadata 256. The core content 242 is the main content that is consumed by user of the client device 280; the word chunk data 244 is the audio-text synchronization data including the timestamps for the audio data and the character offsets for the text data; the context-based dictionaries 248 may be comprised of two main parts: one part for entries based upon linguistic context and the other part for entries based generally upon non-linguistic context; reference data 250 that may be used in creating the custom dictionaries; the user data 252, which is information used by the system to present content on a client device 280 in accordance with the human user's preferences, bookmarks, notes, messages and other data pertaining to users of the system; and feedback data 254, which is data that in an embodiment may be input by a user through a client device 280, and in other embodiments may be input through the AI Machine 210 or other devices, and provides feedback for modifying the word chunk data 244 or the context-based dictionaries 248 or other data in the system.

The Content Server 270 serves various data to the client device 280. In this embodiment, the content server 270 executes several programs, including the settings manager 272, which manages sending user settings to the user device and storing user settings when they are updated; the page generator 274, which generates book pages to be displayed on the client device 280; the media streamer 276 which streams audio and video to the client device 280; the dictionary data streamer 278, which streams dictionary data to the client device 280.

FIG. 3 illustrates an example embodiment of a reader player application 282 window of a client device 280 of a multimedia system using context-based dictionaries. In this embodiment, there is a navigation and settings panel 302, a multimedia window 304, which displays video content, a text window 306, which displays a transcription of the multimedia content, a search window 308, for searching for linguistic and non-linguistic content, and a context-based dictionary window 310, for displaying various information about linguistic entries in the context-based dictionaries 248.

The navigation and settings panel 302 is an example embodiment of a set of buttons that trigger actions by the system and may cause further windows or settings tools to appear and disappear. In this example embodiment, a non-exhaustive sample list of actions and settings may include: setting the video play speed for content in the multimedia window 304, setting the font size and color of the text in the text window 306, navigating several seconds, scenes, or episodes forward or backward in the multimedia content that is being played, setting a bookmark, setting attributes in a user profile, sharing text or sound bites via social media, email or messaging, creating notes, setting a timer, setting billing, account, purchasing, and subscription information, and so forth. The buttons and tools in the navigation and settings panel 302 may be implemented in various and multiple configurations and forms, including dropdown menus, sliders, buttons, and so forth, without materially changing the basic functionality of the system.

The context-based dictionary window 310 illustrates an embodiment in which the linguistic dictionary entries are presented on the client device 280. In various embodiments, the information appearing in the context-based dictionary window 310 could be displayed by having the window always open, by having a pop-up window appear whenever a particular word is selected in the text window 306, by having a gloss appear above a selected word or phrase, or in some other manner that is customary or useful as might be evidenced in popular software applications that provide dictionary information to consumers.

Figure 4A:
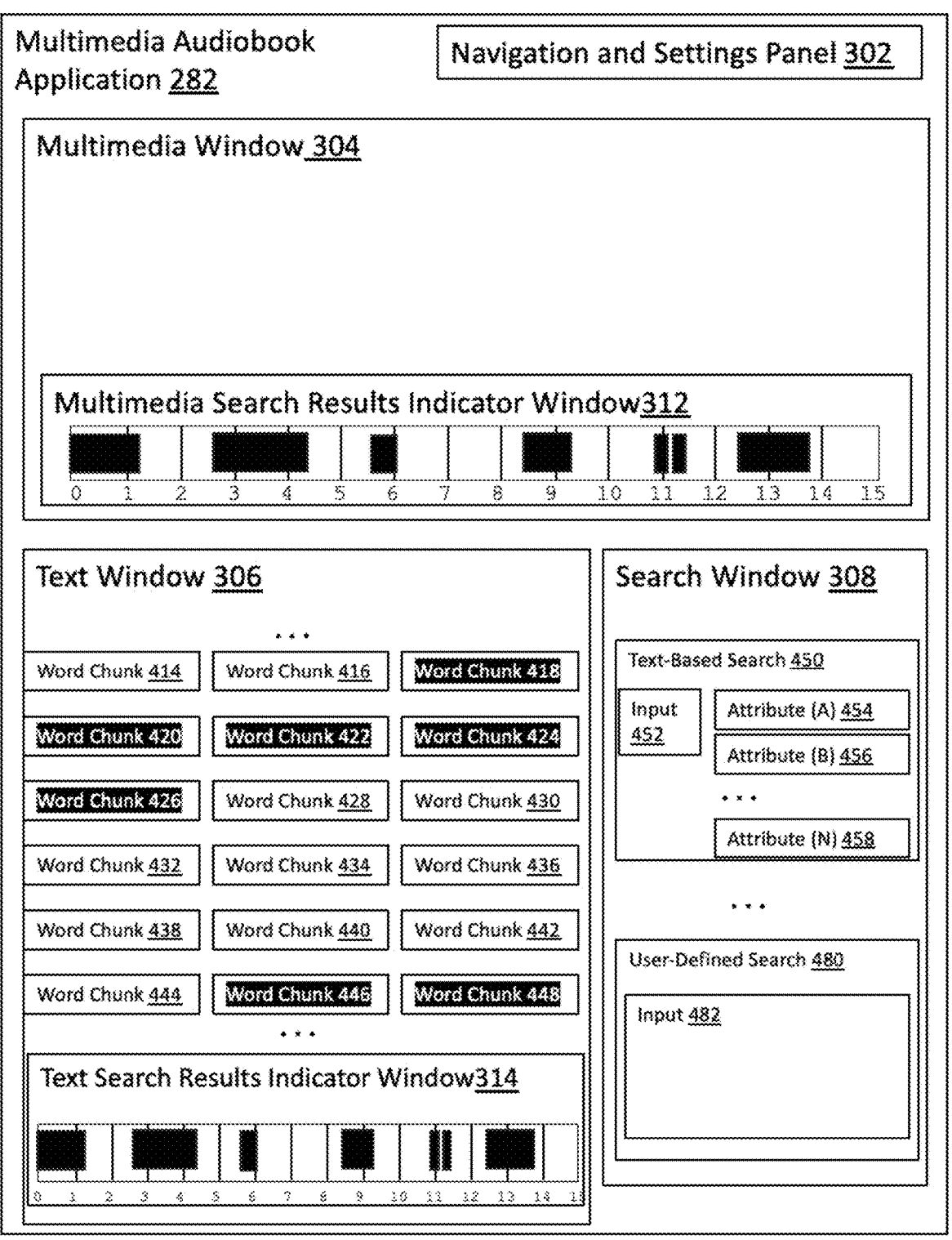
FIG. 4a shows an example embodiment of a user device screen during a search.

FIG. 4a is a block diagram showing an embodiment of the multimedia audiobook application 282 on the client device 280 showing various components on the screen during search. The user may specify the search by entering a word or phrase in the search window 308 and optionally selecting or entering one or more attributes in one of several search windows depending upon search type, such as text-based search 450 or user-defined search 480; in the embodiment illustrated in FIG. 4a, the search criteria may be entered in input 452 or input 482, and attributes set via such interface elements as attribute (A) 454, attribute (B) 456, attribute (N) 458. The matching results are shown in the text window 306 through the highlighting of words and in the text search results indicator window 314 and the multimedia search results indicator window 312 through the highlighting of sections of a timeline representing the core content 242. In this example, the text window 306 shows the word chunks 418, 420, 422, 424, 426, 446, 448 as highlighted matches, and word chunks 414, 416, 428, 430, 432, 434, 436, 438, 440, 442, 444 as unhighlighted and thus not matching the search. In this embodiment, black rectangles imposed on a scale from 0 to 15 are displayed in the text search results indicator window 314 and the multimedia results indicator window 312, indicating the relative position of the matches in the core content 242. In this embodiment, a scale from 0 to 15, indicating the relative position of the matches in the core content 242 files has been used as an example illustration. There are various other possible embodiments for indicating search match results, including but not limited to a linguistic listing of matching words and phrases in the linguistic core content 242 and the corresponding time slice information in the multimedia core content 242, varying graphical representations of such matches indicating their relative position in the core content 242, audio or multimedia representations of matches and so on.

FIG. 4a shows only one text window 306, but another embodiment may support multiple languages, and thus there could be two or more text windows displaying essentially the same content as in text window 306 but in other languages. Such an embodiment may be useful for searching in multiple languages, for editing and creating closed captions or foreign language dubbing, for language learning, and for other tasks that benefit from having the content in more than one language.

FIG. 4b is a block diagram showing an embodiment of an expanded view of the search window 308. During a search, the user may specify the search by typing a word or phrase and optionally selecting or typing one or more attributes. Although the embodiment shown in FIGS. 4a and 4b uses text input, another embodiment could use voice input, gestures or some other input method. In FIG. 4b, there are four types of search shown: text-based search 450, multimedia object-based search 460, emotion-based search 470, and user-defined search 480, each having its own input box: input 452, input 462, input 472, input 482. Each type of search also has several attributes that may be selected to specify the search further.

Examples of text-based search 450 might be to search for all words that are synonymous with the word "tall", for instances of the word "record" used as a verb, or for all words that rhyme with "teacher". In an embodiment, the user may select an attribute (A)-(N) 454, 456, . . . 458 that is labeled "synonym", "proper noun", or "rhyme" and type "tall", "record", and "teacher" into input 452. In this example, as in the following examples of other search types, various embodiments may use different and varying interfaces and input methods and may use various combinations of attributes to specify the search.

Examples of multimedia object-based search 460 might be to search for all scenes that contain a character named "Jack", scenes that take place in a store, or scenes with animals. In an embodiment, the user may select one or more attributes (A)-(N) 464, 466, . . . 468 with an appropriate label and type a word or phrase into the input 462 box.

Examples of an emotion-based search 470 might be to search for all scenes that are scary, happy or melancholy. In an embodiment, the user may select one or more attributes (A)-(N) 474, 476, . . . 478, and type a word or phrase into the input 472 box.

A user-based search 480 may be used to create new search types or refine existing search types. For example, a user may want to search for all scenes in which two particular characters are shouting at each other in a public setting. Another example might be searching for scenes in which a character attempts to make an offensive joke. The user may input such a search scenario into the box input 482, which would be sent to the AI machine 210, which would use the multimedia analyzer 212 and story analyzer 216 to generate matching results. If the inputs for user-based search 480 are comprised of attributes for which there are already separate dictionary entries, then an intersection of time slices for those entries may be considered the search result, obviating the need for sending data to the multimedia analyzer 212 or story analyzer 216. In an embodiment, if the new search type is deemed to be of high value for future use, the system may further decide to incorporate this new type of search into the application code of the multimedia audiobook application 282.

Figure 5:
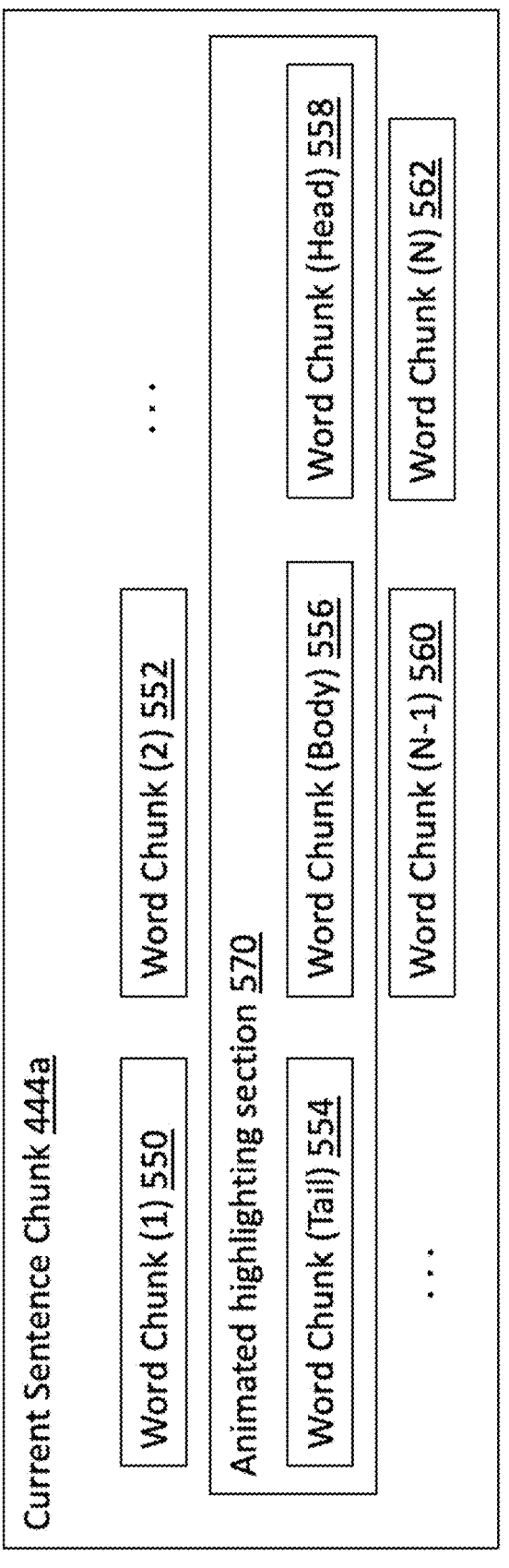
FIG. 5 illustrates word chunk components of a sentence chunk.

FIG. 5 illustrates the composition of the current sentence chunk 444, which is the portion of the core content 242 corresponding to the multimedia time slice that is currently being played by the multimedia audiobook application 282. It is made up of one or more word chunks 550, 552, 554, 556, 558, 560, 562. Each word chunk has a text component and a multimedia component, and the system stores word chunk data, including the character offsets and multimedia timestamp data, to enable highlighting and playback. In one embodiment, the system highlights the entire current sentence chunk 444, and uses a distinct highlighting method, as illustrated in FIG. 5 as the animated highlighting section 570, which highlights the current words within the word chunks that are being played or immediately precede or follow the current word.

In this snapshot of one point in time of an embodiment, the animated highlighting section 570 is made up of three word chunks: word chunk (body) 556 is the textual representation of the word chunk multimedia content that is being played, word chunk (tail) 554 is the textual representation of the word chunk multimedia content that has just been played, and word chunk (head) 558 is the textual representation of the word chunk multimedia content that is about to be played. The highlighting "moves" from left to right in this example, showing the natural direction and flow of English, although for other languages the natural direction may be right to left or vertical movement from top to bottom.

FIGS. 6a and 6b illustrate an example embodiment of the highlighting of words in a text as the multimedia content for those words is being played to a user.

FIG. 6a illustrates certain technical details of an embodiment that uses character offsets and multimedia timestamps in implementing highlighting of text and synchronizing the highlighting with the multimedia content as it is being played.

The multimedia timeline in FIG. 6a is shown for illustration purposes as each letter is shown to have a duration of 100 units, which are arbitrary index values that do not necessarily correspond to real-time. In an embodiment, timestamps may be denoted by values in milliseconds or using some other measurement.

The example sentence chunk 600 in FIG. 6a is "Joe came back home." and the example sentence chunk 602 in FIG. 6b is "He ate a lot of greasy pizza, and then he went to bed". In FIG. 6a, the word chunks 604, 606, . . . 634 are composed of text data and multimedia data. In this example, the first word chunk 604 of example sentence chunk 600 is made up of the text "Joe," which starts at character offset 0, contains three characters, and the multimedia content that can be found in the multimedia file beginning at timestamp 0 and lasting until timestamp 300. The second word chunk 606 is of example sentence chunk 600 is made up of the text "came", which starts at offset 4, contains four characters, and the multimedia content that can be found in the multimedia file beginning at timestamp 400 and lasts until timestamp 800.

In an embodiment, although word chunks may be made up of exactly one word, there may be exceptions, particularly if the audio component of the word chunk justifies it. For example, word chunk 618 is represented by the two words "lot of," which may be pronounced as a conjoined "lotta", forming a single word chunk. Moreover, in other embodiments, a word chunk may be made up of several words, a fraction of a word, or one or more units such as morae, morphemes, or other segmentable units.

In European languages with the Latin or Cyrillic script, words in text are typically demarcated by spaces and punctuation, and word chunks are typically composed of one word. In languages using other scripts, such as Chinese, words are not typically demarcated by spaces, and thus different word segmentation algorithms may be used. There are industry-standard segmentation algorithms and word segmentation software programs available, which a person skilled in natural language processing techniques can be expected to be aware of, and in general, any such algorithm or software program may be used in an embodiment so long as it produces consistent results. The system herein does not depend upon a particular word segmentation implementation.

FIG. 6b illustrates an embodiment showing highlighting from the perspective of user experience. Here, the example sentence chunk 602 represents a sentence being displayed without highlighting. In example sentence chunk with animated highlighting 640 (in FIG. 6b), the word chunk 620 (in FIG. 6a) that is currently being played is "greasy", indicating that the currently playing multimedia timing offset into the multimedia file is between timestamps 3600 and 4200; thus, "greasy" has the most distinctive highlighting, and the word chunks 618 and 622 before and after it, "lot of" and "pizza", have highlighting that is less distinctive. In the next stage, the example sentence chunk with animated highlighting 642 shows the animated highlighting section 652 as being the words "greasy pizza, and", word chunks 620, 622, 624, where the word "pizza" is currently being played, and is thus most distinctively highlighted. In the example sentence chunk with animated highlighting 644, the animated highlighting section 654 has moved to the words "pizza, and the", word chunks 622, 624, 636, in which the current word chunk 624 is "and" and is thus most distinctively highlighted.

In other embodiments, animated highlighting may be implemented based on characters rather than words or may be calculated based on numbers or lengths of characters and words, a measurement of pixel size or length, or some other measurement or combination of measurements and calculations. In addition, the animated highlighting may be implemented such that the highlighting is longer or shorter, uses different shades of color, is a marking that advances below, above, or through the words in the text as the corresponding multimedia content is being played, or any other visually intuitive manner that indicates multimedia and text synchronization.

Figure 7:
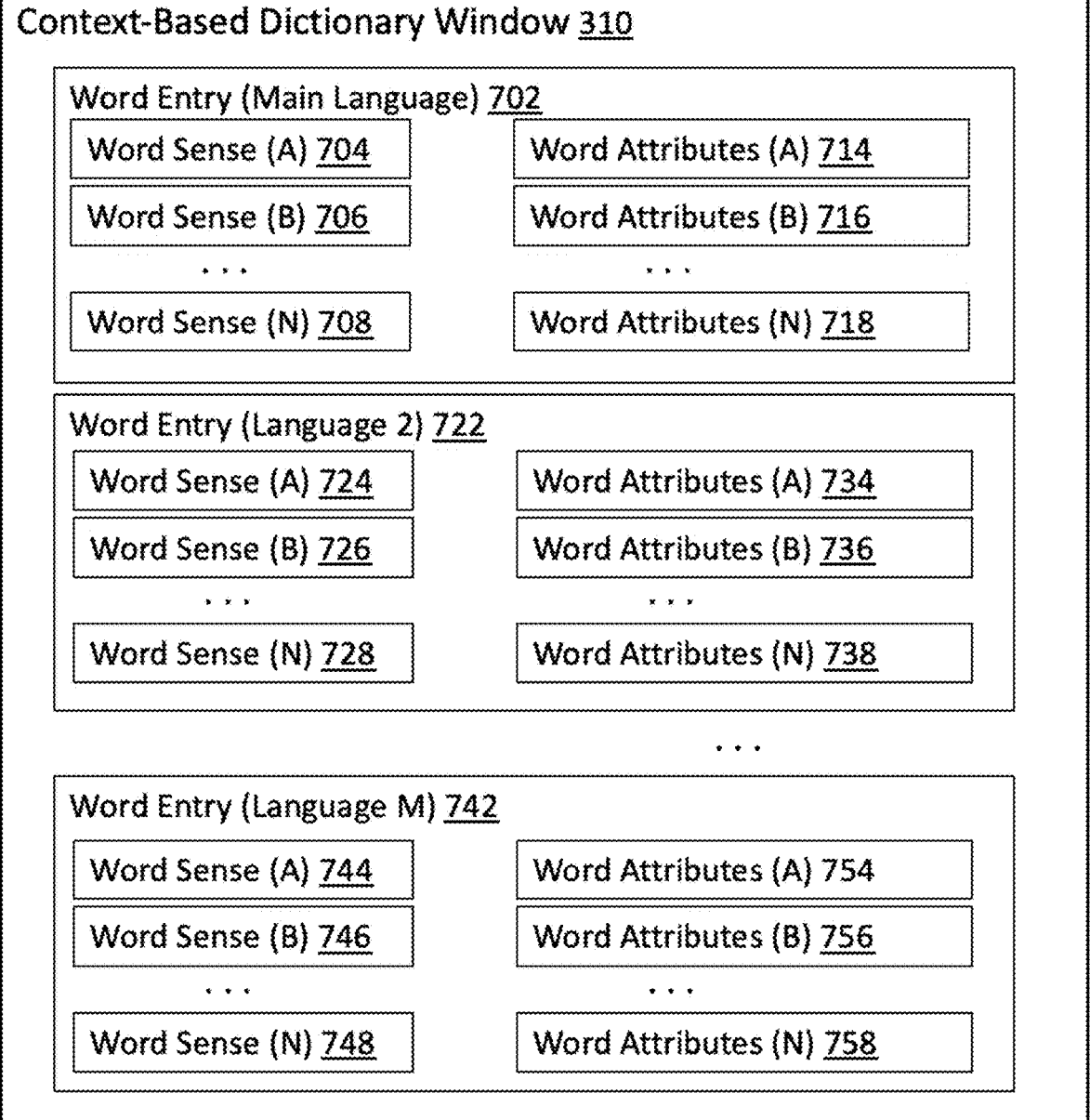
FIG. 7 is a simplified diagram of an example embodiment of a dictionary window displaying multilingual data.

FIG. 7 illustrates an example embodiment of a context-based dictionary window 310 on the client device 280. The word entry (main language) 702 may be accompanied by one or more word entries in other languages, such as word entry (language 2) 722 and word entry (language M). Each word entry, 702, 722, 724, has one or more word senses, word sense (A) 704, word sense (B) 706, word sense (N) 708, word sense (A) 724, word sense (B) 726, word sense (N) 728, word sense (A) 744, word sense (B) 746, word sense (N) 748. The display order of the word senses is set by determining 1170 the order of word senses for each entry. For each word sense, 704, 706, 708, 724, 726, 728, 744, 746, 748, there is a corresponding set of word attributes, 714, 716, 718, 734, 736, 738, 754, 756, 758, which may include pronunciation, part of speech information, glosses and definitions in various languages, example sentences, and other relevant information to assist a human user of the client device 280 in understanding the words of the text in context. The context-based dictionaries 248 definitions may include attributes, including time slice or positional information, which are not displayed in FIG. 7, or attributes that are useful for searching and, in various embodiments, may or may not be displayed in the context-based dictionary window 310.

FIG. 8 illustrates an example embodiment of a process for processing content data and presenting it in a multimedia system using context-based dictionaries via the client device 280. First, the system retrieves 800 multimedia and text data, the core content 242 from the data repository 240. If there are missing input files, the system will auto-generate 802 needed files for core content by calling upon the AI machine 210 and the NLP machine 220, as described below. The core content 242 may comprise, among other files and data, an original text file, which represents the core audiobook content. If multiple language versions of the linguistic core content 242 are needed, and there is no text file in a desired language that corresponds in content, meaning, and order to the original text file in the core content 242, the system may auto-generate 802 translated text by sending the original text file of the core content 242 to the automatic translator 232 of the NLP machine 220. Furthermore, if there is no multimedia file in the core content 242 corresponding to the original text file, audio and multimedia files may be created using a text-to-speech generator 230 or a multimedia generator 214, resulting in such output being added to the data repository 240 as core content 242.

Next, the audio-text matcher 222 of the NLP machine 220 analyzes 810 the multimedia and text data for synchronizing. This step divides the multimedia and text data into discrete chunks, "word chunks", which in the text data may be a block of contiguous characters, which state-of-the-art NLP parsers can generally segment into "words", along with the corresponding multimedia segment represented by time-stamps demarking the beginning and ending times in the multimedia file. The process then stores 820 this word chunk data in the data repository 240.

Next, the NLP machine 220 analyzes 830 sentence data for aligning. The NLP machine 220 takes two text files that represent corresponding content in different languages and calculates which phrases and sentences, which we call "sentence chunks", from the text file in one language correspond to similar content in the other language. The process then stores 840 the sentence chunk alignment data in the data repository 240.

Next, the system retrieves 850 text data, reference data and feedback data for creating or modifying dictionaries. The text data refers to the original text file that comprises the content of the multimedia content; the reference data refers to pronunciation data, mono-lingual and multilingual definitions and gloss data, tags, example sentences, and other explanatory data that may include text, images, video or other multimedia content; the feedback data refers to data collected from users, AI, and other sources, which may include actions such as rating the dictionary entries, suggesting modifications to definitions, adding example sentences, is used to improve or enhance the dictionary. The retrieved 850 text and other data is used by the AI machine 210 and the NLP machine 220 to create 860 or modify custom dictionaries for linguistic content, or to create 880 or modify custom dictionaries for multimedia content, which are then stored in the data repository 240 in a context-based dictionary 248.

In accordance with dictionary modifications, including modified and newly created entries, the system may modify or create content 890, including linguistic and non-linguistic content, using the story generator 218 and the multimedia generator 214.

When a user consumes content on a client device 280, the system presents 892 content to the user in accordance with the user settings and user actions via the content server 270, and stores various user inputs in the data repository 240 under user data 252. A user action that is particularly relevant to this system is searching, which is explained in detail in the descriptions of FIGS. 11a, 11b and 11c below.

Figure 9:
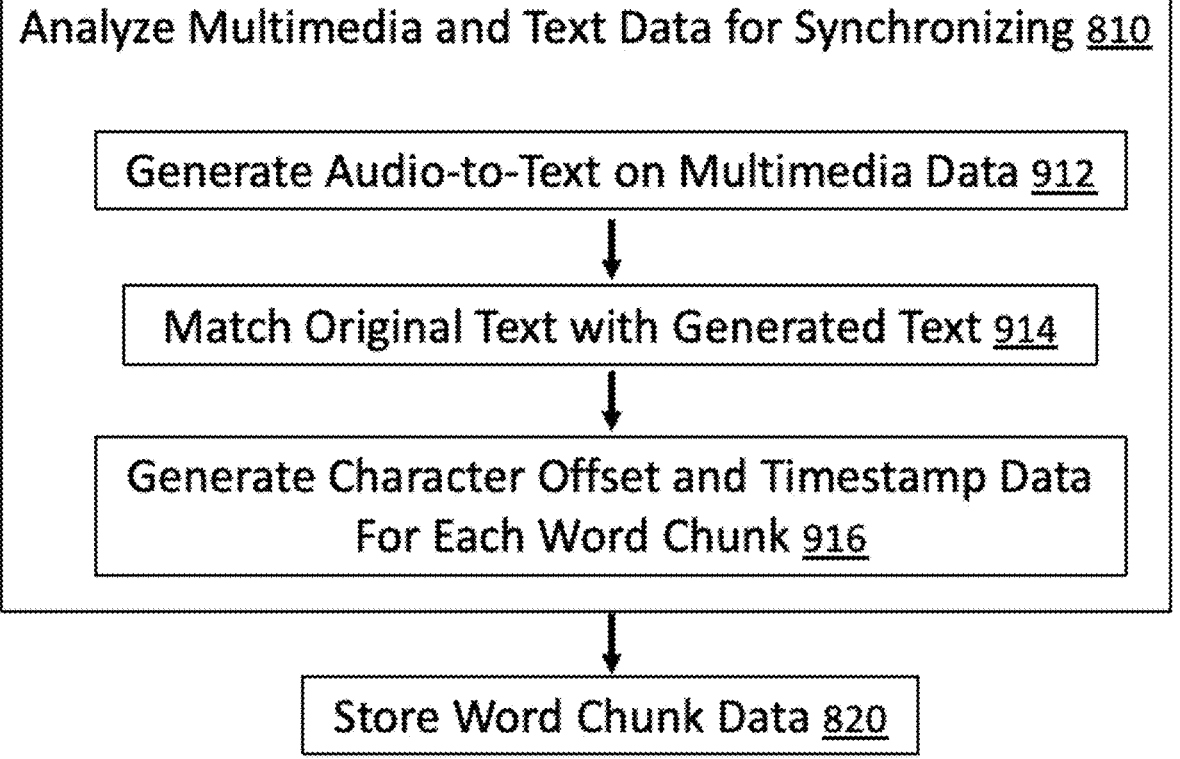
FIG. 9 shows an example embodiment of the audio and text synchronization process listed in FIG. 8.

FIG. 9 illustrates an example embodiment of a process for analyzing 810 multimedia and text data for synchronizing and then storing 820 word chunk data. First, using the multimedia file as input, the process generates 912 audio-to-text on the multimedia data, resulting in a text file that is a transcription of the multimedia file containing timestamp data for the recognized words. The process next matches 914 original text with the generated text (transcription). We refer to the resulting matches as "word chunks," which typically comprise one word in many natural languages, although depending upon the nature of the language in question and the segmentation process used, a word chunk may include prefixes, suffixes, tense, case, aspect, or other grammatical markers, or may be comprised of one or more morae, morphemes, or other units. The NLP machine 220 then generates 916 character offset data and timestamp data for each word chunk; the system then stores 820 the word chunk data in the data repository 240.

FIG. 10 illustrates an example embodiment of a process to present 892 content to a user in accordance with user settings and user actions and store various user inputs. This is, in effect, the "main loop" of the multimedia audiobook application 282, which continuously monitors user input and responds by taking various actions, such as activating 1000 the context-based dictionary window, activating 1002 the search window, or other actions, listed in FIG. 10, including taking action C 1004 and taking action N 1006.

FIG. 11a illustrates an example embodiment of a process for retrieving 850 text and multimedia data, reference data and feedback data for creating or modifying dictionaries, for creating or modifying 860 dictionaries for linguistic content, for creating or modifying 880 dictionaries for non-linguistic content, and for presenting 892 content to the user in accordance with user settings and user actions, and store various user input. First, the system retrieves 1152 the text data for an audiobook. Next, the system retrieves 1154 multimedia data (audio, video, etc.) that is relevant to the content in the specified texts. Next, the system retrieves 1156 external reference data, which may include pronunciation data, mono-lingual and multilingual definitions and gloss data, example sentences, and other relevant data. Next, the system retrieves 1158 feedback data, which is data collected from users, AI, and other sources, which may include actions such as rating the dictionary entries, suggesting modifications to definitions, adding example sentences, and is used to improve or enhance the dictionary.

FIG. 11b shows an example embodiment of the process for creating or modifying 860 dictionaries for linguistic content. First, the system determines whether the linguistic portion of the dictionary has been initialized. If it has been initialized, the system uses data gathered in the previous step 850 to create new entries or modify existing entries 1160 in the linguistic dictionary. If the linguistic portion of the dictionary has not yet been initialized, the system takes several steps to initialize the dictionary with new dictionary entries. First, it determines 1162 the part of speech of each word and idiomatic phrase in the text. Such words and idioms are called "entries" that will be put into the context-based dictionaries. Next, the system analyzes the semantic proximity of entries to senses of the definitions in the external reference data and ranks them in order of closeness. Next, the system analyzes 1166 relevant multimedia data to determine further useful attributes for each entry. For example, the retrieved multimedia (audio, video, etc.) data may have clues that clarify the context of a particular word or idiom in the original text data and thereby help in determining the most relevant data to be used in a dictionary entry. Next, the system uses 1168 AI to improve the relevance and quality of the data for each dictionary entry. This refinement can be done by considering the context of the words and idioms in the original text data as well as through training the AI program on texts with similar content to the original text data. Next, the process determines 1170 the order of word senses for each entry. This process 1170 uses all the information and data gleaned in previous processes 1162, 1164, 1166, and 1168 herein—part of speech data, semantic proximity ranking, multimedia data, and AI-generated information in determining the best order for the word senses for each dictionary entry. Finally, the system stores 1172 the customized dictionary data in the data repository 240.

FIG. 11c shows an example embodiment of the process for creating or modifying 880 custom dictionaries for non-linguistic content. First, the system determines whether the non-linguistic portion of the dictionary has been initialized. If it has been initialized, the system uses data gathered in the previous step 850 to create or modify 1180 time slice entries in the non-linguistic dictionary. If the non-linguistic portion of the dictionary has not yet been initialized, the system takes several steps to initialize the dictionary with new dictionary entries. First, it initializes 1182 the non-linguistic portion of the context-based dictionaries with preset attributes. Next, it analyzes 1184 multimedia content (of the core content 242) to create attributes; next, it creates 1186 time slice attributes in the non-linguistic dictionary for all entries that have been created; for these two steps, the multimedia analyzer 212 and story analyzer 216 may be used. The final step is to use AI 1188 to update and improve each entry and store this data in the non-linguistic portion of the dictionary.

To create or modify dictionary entries for non-linguistic content, an embodiment may use a human to manually categorize content with appropriate attributes or a machine-based system to automatically categorize content with appropriate attributes. For example, a human could label scenes with such attributes as "protagonist," "briefcase," and "red roses" that describe certain specific or generic physical agents or objects appearing within various time slices of a STORY; a human could further label scenes with such attributes as "outdoors," "at school", "cloudy", "hot" that describe certain specific or generic physical attributes of various time slices of a STORY; a human could further label scenes with such attributes as "sad," "angry", "happy", "quiet" that describe emotional or ambient attributes of various time slices of a STORY; in the preceding cases, the system may insert updated positional information (in an embodiment, time-slices may be used to indicate position) for updating an existing dictionary entry or the system may insert a new dictionary entry containing the new attribute along with the positional information. In addition, in an embodiment, such dictionary entries with attributes may be automatically modified or created using the multimedia analyzer 212 and the story analyzer 216 of the AI machine 210. In such an embodiment, the content in question may serve as input to the AI machine 210, and the multimedia analyzer 212 and the story analyzer 216 may use visual content analysis, affective computing and emotion AI techniques to determine what attributes are relevant to the various scenes, or time slices, of a STORY. In an embodiment, the AI machine 210 may refer to a third-party service such as Google's Visual AI or some other service that analyzes other non-linguistic content and uses an application programming interface (API) such as the Video Intelligence API or some other API. In various embodiments, linguistic and non-linguistic entries may have a similar structure and be combined into one large dictionary, or they may comprise varying implementation structures and comprise multiple dictionaries.

The system may also modify existing content or generate new content based upon modified or new dictionary entries.

FIG. 12 illustrates an example in which, in an embodiment, dictionary entries for a particular STORY, dictionary entries 1200, 1202, 1204, may include the attributes "protagonist," "sad," and "angry" and the intersection of the respective positional information (time slices) of these three attributes may be scenes in the story that have a protagonist who is at the same time both "sad" and "angry", which in this example is time slices C and Z. In order to modify these scenes such that the protagonist ("Fred") is not "sad" and "angry" but is instead "sad" and "frustrated" the following actions may be taken: if a dictionary entry 1206 for "frustrated" does not exist, it is then created and the positional information of the new entry "frustrated" is set to be the intersection of "sad" and "angry"; if a dictionary entry for "frustrated" does exist, then the positional information for the existing entry "frustrated" is modified to include the positional information for the intersection of "protagonist", "sad" and "angry", in this example, time slices C and Z; the positional information for the dictionary entry 1204 "angry" that intersect with dictionary entry 1200 "protagonist" and dictionary entry 1202 "sad", in this example time slices C and Z, may be deleted; once these dictionary entries have been created or modified as indicated here, the system is tasked with creating new content or modifying existing content in accordance with the new dictionary entries, which in this example may involve giving the new or modified data as input to the story generator 218 and the multimedia generator 214, which in an embodiment may call a third party service for generating video.

The system may be used to generate a STORY from scratch with or without assistance from a human user. In the case that a human user is not used, the AI machine 210 may be used without input from a human user. A STORY, considered in its broadest sense, can take various forms, including but not limited to the following: novel, novella, short story, essay, article, memoir, biography, autobiography, travel article, news article, research paper, thesis or dissertation, technical report, product manual, poetry, play, screenplay, songwriting, textbook, persuasive essay, speech, editorial, review, critique. Each of these forms has several critical elements comprising a STORY. A novel, for example, may contain several critical elements such as characters, plot and subplots, dialogue, point of view, tone, setting, theme, conflict, conflict resolution. A research paper, as another example, may contain several critical elements such as title, abstract, introduction, literature review, research methodology, results, discussion, conclusion, references.

The description herein focuses on the case in which a human user and the system, making use of its context-based dictionaries, work together to generate a novel from scratch. The story generator 218 has a collection of STORY frameworks, which serve as templates to hold the critical elements of the STORY. Once the critical elements of a STORY have been determined and defined in sufficient detail, they can be inserted into context-based dictionary entries, which comprise a framework for the STORY, and this data can be sent to the story generator 218 to generate an instantiation of a STORY. The context-based dictionary entries may be used to facilitate and automate the editing and modifying of the linguistic and non-linguistic components of the STORY.

FIG. 13*a* is an example STORY framework for a novel 1300, an embodiment of an interface for presenting and collecting data for a STORY. The critical elements of the STORY are listed on the left—characters 1310, plots 1320, point of view 1330, tone 1340, setting 1350, theme 1360, conflict 1370, resolution 1380, and critical STORY element N 1390—and summaries of the respective values for those critical elements are listed on the right. FIG. 13*b* shows more details for an example of the critical STORY element characters 1310 in an example novel in which the protagonist 1312 "Sally" is 32 years old and has various character traits, including being resilient. A similar method can be used for other forms of a STORY; for example, a research paper may have an interface to display and collect data for its critical elements, which may include title, abstract, introduction, literature review, research methodology, results, discussion, conclusion, references.

Once the framework with the critical elements for a STORY has been defined, that data can be sent to the story generator 218 to generate a linguistic instantiation of the STORY. The linguistic instantiation of the STORY can then be sent to the dictionary creator 226 and dictionary updater 228 to add new entries to the context-based dictionary. The context-based dictionary and the text for the story can be input into the text-to-speech generator 230 and the multimedia generator 214 to create audio and multimedia instantiations of the STORY.

The data in the context-based dictionary may be used to present an existing STORY framework to a human user, and which may be modified and re-sent to the story generator 218 and multimedia generator 214 to modify the text and the non-linguistic components of the instantiation of the STORY.

Characteristics or attributes of characters, objects and other elements in a STORY may change over time. For example, a character may age during the STORY or may become wiser, richer, heavier; the relationships between characters may change over time; the weather in the setting may change. Such changes may be defined by using time slices for various attributes that are used to describe elements in the STORY.

The framework for a particular STORY may be generated completely by a human user or may be automated by using artificial intelligence to generate certain elements or attributes of those elements. For example, a human user may define for a particular STORY the protagonist as a 30-year-old woman who is intelligent, quirky, and sentimental; for other attributes of the protagonist, the human user may want to allow the system latitude so that it comes up with a more "enticing", or "convincing" character that is most suitable for the particular STORY. In the most extreme case, a human user may allow all critical elements of a STORY to be decided by the system, in which case the generation may be made based upon an existing framework, and the output may be random. The human user may choose an interactive approach, whereby they initialize the value of certain critical elements, then have the system generate output; in the next cycle(s) the human user can modify certain attributes of elements in the STORY, then have the system re-generate output; human user repeats this until the STORY gives a desirable result.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the embodiments disclosed herein without departing from the scope defined in the appended claims.

The invention claimed is:

1. A method for presenting context-based dictionaries in a multimedia device, the method comprising:

obtaining a multimedia file including speech content;

obtaining at least one text file comprising first text corresponding to the speech content;

obtaining synchronization metadata associated with the multimedia file and the at least one text file, the synchronization metadata specifying correspondence between respective word chunks of the speech content, and the first text;

obtaining, for the respective word chunks, external reference data from one or more reference sources that at least includes respective definitions associated with each of the respective word chunks, wherein each of the definitions includes one or more word senses;

performing a part-of-speech and semantic analysis of the respective word chunks to contextually rank the one or more word senses from the external reference data for each of the respective word chunks based at least in part on respective usage contexts of the respective word chunks in at least one of the speech content and the first text;

generating a set of attributes corresponding to the respective word chunks, wherein the set of attributes for a word chunk includes at least a highest contextually ranked word sense for the word chunk and a position of the word chunk in the first text;

generating one or more context-based dictionary entries for a context-based dictionary, the context-based dictionary entries including linguistic dictionary entries corresponding to the respective word chunks, the linguistic dictionary entries including the set of attributes corresponding to the respective word chunks;

storing the one or more context-based dictionary entries to a storage medium associated with the context-based dictionary;

outputting the multimedia file and the at least one text file to a multimedia device to enable the multimedia device to concurrently present the first text of the at least one text file in a text display window of a user interface screen in synchronization with the speech content of the multimedia file;

while presenting the first text in synchronization with the speech content, obtaining, from the multimedia device, an input selecting a first word chunk in the first text;

identifying a first entry from the context-based dictionary matching the first word chunk in the first text; and outputting the first entry including the set of attributes based on the respective usage contexts for presentation in a context-based dictionary window of the user interface screen displayed concurrently with the text display window on a display of the multimedia device.

2. The method of claim 1, wherein generating the set of attributes comprises:

performing an audiovisual analysis of the multimedia file to detect contextual audiovisual information associated with a target word chunk; and generating the set of attributes based on the audiovisual analysis.

3. The method of claim 1, wherein generating the set of attributes comprises:

applying a machine learning model to a target word chunk to infer relevance scores of candidate attributes to a target word chunk, the machine learning model trained on labeled training text or labeled multimedia content labeled with relevant attributes; and generating the set of attributes for the target word chunk based on the relevance scores.

4. The method of claim 1, wherein generating the set of attributes comprises:

obtaining the set of attributes associated with a target word chunk in the text file or the multimedia file based on metadata associated with the text file or the multimedia file.

5. The method of claim 1, wherein generating the set of attributes associated with a target word chunk based on at least one of: a character, an object, a scene, an environment, a plot, an emotion, a sensation, a perception, or a sentiment.

6. The method of claim 1, wherein generating the set of attributes comprises generating, based on the synchronization metadata, a position of a target word chunk in the speech content.

7. The method of claim 1, wherein generating the context-based dictionary entries further comprises:

generating one or more non-linguistic dictionary entries for the context-based dictionary, the one or more non-linguistic dictionary entries corresponding to respective non-linguistic characteristics of the multimedia file, and wherein the one or more non-linguistic dictionary entries identify one or more time slices in the multimedia file where a corresponding non-linguistic characteristic is represented.

8. The method of claim 7, wherein the one or more non-linguistic dictionary entries further include at least one attribute associated with the one or more non-linguistic characteristics.

9. The method of claim 7, wherein the one or more non-linguistic dictionary entries corresponds to at least one of: a visual, auditory, tactile, gustatory, olfactory or other sensory characteristic depicted in the one or more time slices of the multimedia file, a character of a story represented in the one or more time slices, a scene represented in the one or more time slices, an emotion associated with the one or more time slices, a perception associated with the one or more time slices, and a sentiment associated with the one or more time slices.

10. The method of claim 7, wherein generating the one or more non-linguistic dictionary entries comprises:

performing an audiovisual analysis of visual content or non-speech sounds in the multimedia file.

11. The method of claim 7, wherein at least one of the non-linguistic characteristics is represented in the one or more non-linguistic dictionary entries by a generated term that is absent from the word chunks in the one or more time slices.

12. A non-transitory computer-readable storage medium storing instructions for presenting context-based dictionaries in a multimedia device, the instructions when executed by a processor causing the processor to perform steps including:

obtaining a multimedia file including speech content;

obtaining at least one text file comprising first text corresponding to the speech content;

obtaining synchronization metadata associated with the multimedia file and the at least one text file, the synchronization metadata specifying correspondence between respective word chunks of the speech content, and the first text;

obtaining, for the respective word chunks, external reference data from one or more reference sources that at least includes respective definitions associated with each of the respective word chunks, wherein each of the definitions includes one or more word senses;

performing a part-of-speech and semantic analysis of the respective word chunks to contextually rank the one or more word senses from the external reference data for each of the respective word chunks based at least in part on respective usage contexts of the respective word chunks in at least one of the speech content and the first text;

generating a set of attributes corresponding to the respective word chunks, wherein the set of attributes for a word chunk includes at least a highest contextually ranked word sense for the word chunk and a position of the word chunk in the first text;

generating one or more context-based dictionary entries for a context-based dictionary, the context-based dictionary entries including linguistic dictionary entries corresponding to the respective word chunks, the linguistic dictionary entries including the set of attributes corresponding to the respective word chunks;

storing the one or more context-based dictionary entries to a storage medium associated with the context-based dictionary;

outputting the multimedia file and the at least one text file to a multimedia device to enable the multimedia device to concurrently present the first text of the at least one text file in a text display window of a user interface screen in synchronization with the speech content of the multimedia file;

while presenting the first text in synchronization with the speech content, obtaining, from the multimedia device, an input selecting a first word chunk in the first text;

identifying a first entry from the context-based dictionary matching the first word chunk in the first text; and outputting the first entry including the set of attributes based on the respective usage contexts for presentation in a context-based dictionary window of the user interface screen displayed concurrently with the text display window on a display of the multimedia device.

13. The non-transitory computer-readable storage medium of claim 12, wherein generating the set of attributes comprises:

performing an audiovisual analysis of the multimedia file to detect contextual audiovisual information associated with a target word chunk; and generating the set of attributes based on the audiovisual analysis.

14. The non-transitory computer-readable storage medium of claim 12, wherein generating the set of attributes comprises:

applying a machine learning model to a target word chunk to infer relevance scores of candidate attributes to a target word chunk, the machine learning model trained on labeled training text or labeled multimedia content labeled with relevant attributes; and generating the set of attributes for the target word chunk based on the relevance scores.

15. The non-transitory computer-readable storage medium of claim 12, wherein generating the set of attributes comprises:

obtaining the set of attributes associated with a target word chunk in the text file or the multimedia file based on metadata associated with the text file or the multimedia file.

16. The non-transitory computer-readable storage medium of claim 12, wherein generating the set of attributes associated with a target word chunk based on at least one of: a character, an object, a scene, an environment, a plot, an emotion, a sensation, a perception, or a sentiment.

17. The non-transitory computer-readable storage medium of claim 12, wherein generating the set of attributes comprises generating, based on the synchronization metadata, a position of a target word chunk in the speech content.

18. The non-transitory computer-readable storage medium of claim 12, wherein generating the context-based dictionary entries further comprises:

generating one or more non-linguistic dictionary entries for the context-based dictionary, the one or more non-linguistic dictionary entries corresponding to respective non-linguistic characteristics of the multimedia file, and wherein the one or more non-linguistic dictionary entries identify one or more time slices in the multimedia file where a corresponding non-linguistic characteristic is represented.

19. A multimedia device comprising:

a processor; and a non-transitory computer-readable storage medium storing instructions for presenting context-based dictionaries in the multimedia device, the instructions when executed by the processor causing the processor to perform steps including:

obtaining a multimedia file including speech content;

obtaining at least one text file comprising first text corresponding to the speech content;

obtaining synchronization metadata associated with the multimedia file and the at least one text file, the synchronization metadata specifying correspondence between respective word chunks of the speech content, and the first text;

obtaining, for the respective word chunks, external reference data from one or more reference sources that at least includes respective definitions associated with each of the respective word chunks, wherein each of the definitions includes one or more word senses;

performing a part-of-speech and semantic analysis of the respective word chunks to contextually rank the one or more word senses from the external reference data for each of the respective word chunks based at least in part on respective usage contexts of the respective word chunks in at least one of the speech content and the first text;

generating a set of attributes corresponding to the respective word chunks, wherein the set of attributes for a word chunk includes at least a highest contextually ranked word sense for the word chunk and a position of the word chunk in the first text;

generating one or more context-based dictionary entries for a context-based dictionary, the context-based dictionary entries including linguistic dictionary entries corresponding to the respective word chunks, the linguistic dictionary entries including the set of attributes corresponding to the respective word chunks;

storing the one or more context-based dictionary entries to a storage medium associated with the context-based dictionary;

outputting the multimedia file and the at least one text file to a multimedia device to enable the multimedia device to concurrently present the first text of the at least one text file in a text display window of a user interface screen in synchronization with the speech content of the multimedia file;

while presenting the first text in synchronization with the speech content, obtaining, from the multimedia device, an input selecting a first word chunk in the first text;

identifying a first entry from the context-based dictionary matching the first word chunk in the first text; and outputting the first entry including the set of attributes based on the respective usage contexts for presentation in a context-based dictionary window of the user interface screen displayed concurrently with the text display window on a display of the multimedia device.

20. The multimedia device of claim 19, wherein generating the one or more context-based dictionary entries further comprises:

generating one or more non-linguistic dictionary entries for the context-based dictionary, the one or more non-linguistic dictionary entries corresponding to respective non-linguistic characteristics of the multimedia file, and wherein the one or more non-linguistic dictionary entries identify one or more time slices in the multimedia file where a corresponding non-linguistic characteristic is represented.

* * * * *